(12) United States Patent
Eguchi

(10) Patent No.: US 9,964,743 B2
(45) Date of Patent: May 8, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Yosuke Eguchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 14/948,508

(22) Filed: Nov. 23, 2015

(65) Prior Publication Data

US 2016/0154219 A1     Jun. 2, 2016

(30) Foreign Application Priority Data

Nov. 28, 2014   (JP) ................................. 2014-240828
Nov. 28, 2014   (JP) ................................. 2014-240829

(51) Int. Cl.
| | |
|---|---|
| *G02B 15/14* | (2006.01) |
| *G02B 13/02* | (2006.01) |
| *G02B 15/16* | (2006.01) |
| *G02B 15/173* | (2006.01) |
| *G02B 27/00* | (2006.01) |

(52) U.S. Cl.
CPC ............ *G02B 15/16* (2013.01); *G02B 15/173* (2013.01); *G02B 27/0025* (2013.01)

(58) Field of Classification Search
CPC .... G02B 15/173; G02B 15/177; G02B 15/17; G02B 7/102; G02B 7/10; G02B 13/02
USPC ....... 359/687, 686, 688, 680, 676, 745, 684, 359/695, 694
See application file for complete search history.

(56) References Cited

U.S. PATENT DOCUMENTS 5,739,961 A * 4/1998 Nakayama ........... G02B 15/173
                                                                              359/684

2014/0268366 A1    9/2014 Shinohara

FOREIGN PATENT DOCUMENTS

| | | |
|---|---|---|
| CN | 102129118 A | 7/2011 |
| EP | 2650711 A1 | 10/2013 |
| EP | 2650712 A1 | 10/2013 |
| EP | 3026481 A1 | 6/2016 |

(Continued)

OTHER PUBLICATIONS

European search report issued in corresponding application No. 15195784.2 dated Mar. 29, 2016.

(Continued)

*Primary Examiner* — Dawayne A Pinkney
(74) *Attorney, Agent, or Firm* — Carter, DeLuca, Farrell & Schmidt, LLP

(57) ABSTRACT

Provided is a zoom lens, including, in order from an object side to an image side: a positive first lens unit; a negative second lens unit; a positive third lens unit; and a rear lens group including at least one lens unit, in which the first lens unit is not configured to move for zooming, and the second lens unit, the third lens unit, and at least one lens unit included in the rear lens group are configured to move during zooming so that intervals between adjacent lens units are changed during zooming. A lateral magnification of the second lens unit at a wide angle end, a lateral magnification of the second lens unit at a telephoto end, a movement amount of the third lens unit during zooming from the wide angle end to the telephoto end, and a total length of the zoom lens are appropriately set.

11 Claims, 19 Drawing Sheets

(56) References Cited

FOREIGN PATENT DOCUMENTS

| JP | 2007-328306 A | 12/2007 |
| JP | 2012-088603 A | 5/2012 |
| JP | 2013-120326 A | 6/2013 |

OTHER PUBLICATIONS

Office Action for corresponding Chinese Application No. 201510831608.3 dated Jul. 27, 2017.

* cited by examiner

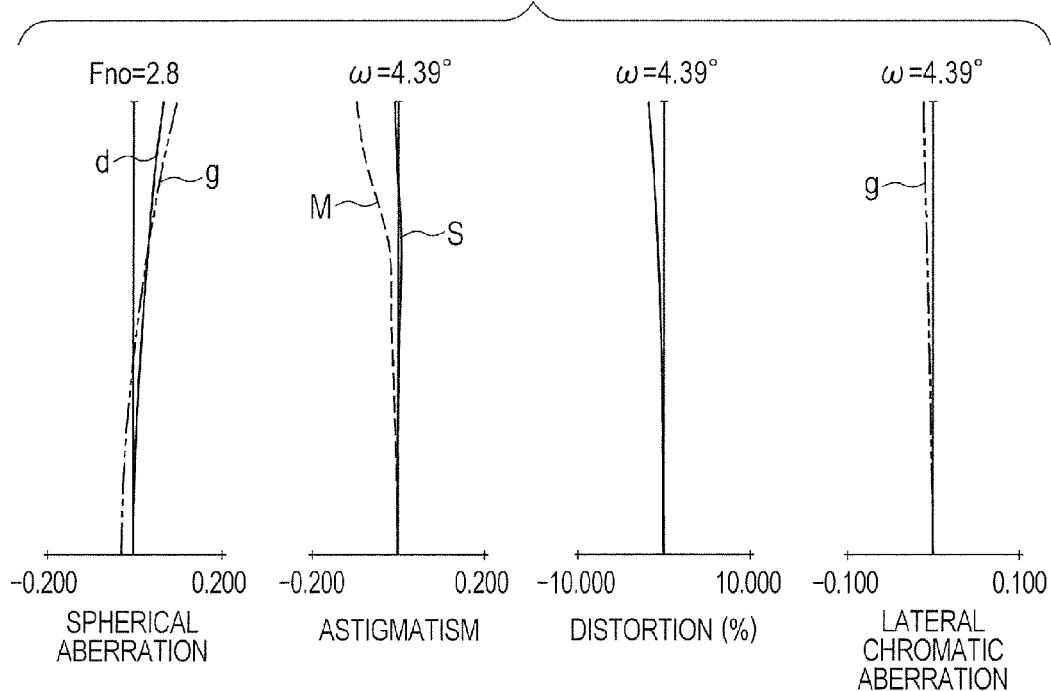
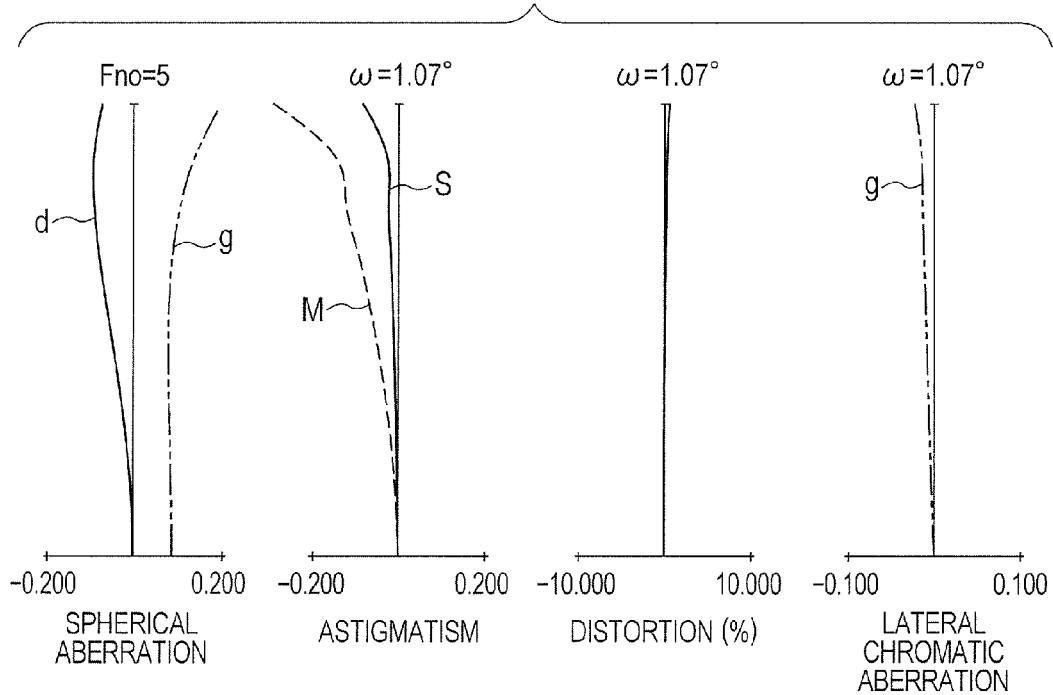

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup apparatus using a solid-state image pickup element, such as a video camera, an electronic still camera, a broadcasting camera, or a monitoring camera, or an image pickup apparatus such as a silver-halide film camera.

Description of the Related Art

In recent years, as an image pickup optical system to be used in an image pickup apparatus using a solid-state image pickup element, a zoom lens is required to have a short total length, be compact (small in size), and have a high zoom ratio (high zoom ratio) as well as a high resolution. As a zoom lens that satisfies those requirements, a positive-lead type zoom lens in which a lens unit having a positive refractive power is arranged on an object side has been known. As the positive-lead type zoom lens, a zoom lens including four lens units or five lens units as a whole has been known.

In Japanese Patent Application Laid-Open No. 2013-120326, a zoom lens having a four-unit configuration including, in order from an object side to an image side, a first lens unit to a fourth lens unit having positive, negative, positive, and positive refractive powers is described. The second lens unit and the fourth lens unit are configured to move during zooming, and the fourth lens unit is configured to move during focusing.

In Japanese Patent Application Laid-Open No. 2012-88603, a zoom lens having a four-unit configuration including, in order from an object side to an image side, a first lens unit to a fourth lens unit having positive, negative, positive, and positive refractive powers is described. The second, third, and fourth lens units are configured to move during zooming, and the fourth lens unit is configured to move during focusing.

In Japanese Patent Application Laid-Open No. 2007-328306, a five-unit zoom lens including, in order from an object side to an image side, a first lens unit to a fifth lens unit having positive, negative, positive, positive, and negative refractive powers is described. The second lens unit and the fourth lens unit are configured to move during zooming, and the fourth lens unit is configured to move during focusing.

In recent years, the zoom lens to be used in the image pickup apparatus is strongly desired to have the high zoom ratio and be small in size as the entire system in order to adapt to the downsizing of the image pickup apparatus. The above-mentioned positive-lead type zoom lens is relatively easy to downsize as the entire system and realize the high zoom ratio. However, in the above-mentioned positive-lead type zoom lens, in order to realize the high zoom ratio while further downsizing the entire system, it is important to appropriately set lateral magnifications of the respective lens units.

For example, in order to realize the high zoom ratio while downsizing the entire system, it is important to appropriately set lateral magnifications of the second lens unit at a wide angle end and a telephoto end, which mainly varies a magnification. When the lateral magnifications of the second lens unit at the wide angle end and the telephoto end are not appropriate, it becomes difficult to attain the high zoom ratio while downsizing the entire system.

Moreover, in realizing the high zoom ratio, when a lateral magnification held by the second lens unit at the time of varying the magnification is not appropriately set, the effect on a change in back focus with respect to a movement amount of the second lens unit in an optical axis direction is increased near the telephoto end, that is, a so-called focus sensitivity is increased. As a result, it becomes difficult to control zooming by moving the lens units near the telephoto end. For example, in a zoom lens for a monitoring camera, which is required to realize the high zoom ratio, it is important to appropriately set the lateral magnification held by the second lens unit during varying the magnification, and reduce the focus sensitivity of the second lens unit at the telephoto end.

SUMMARY OF THE INVENTION

According to one embodiment of the present invention, there is provided a zoom lens, including, in order from an object side to an image side:

a first lens unit having a positive refractive power;

a second lens unit having a negative refractive power;

a third lens unit having a positive refractive power; and a rear lens group including at least one lens unit, in which during zooming, the first lens unit is not configured to move, and the second lens unit, the third lens unit, and at least one lens unit included in the rear lens group are configured to move so that intervals between adjacent lens units are changed during zooming, and in which the following conditional expressions are satisfied:

$$20.0 < \beta 2t/\beta 2w < 150.0; \text{ and}$$

$$0.01 < M3t/TD < 0.20,$$

where β2w represents a lateral magnification of the second lens unit at a wide angle end, β2t represents a lateral magnification of the second lens unit at a telephoto end, M3t represents a movement amount of the third lens unit during zooming from the wide angle end to the telephoto end, and TD represents a total length of the zoom lens.

Further, according to another embodiment of the present invention, there is provided a zoom lens, including, in order from an object side to an image side:

a first lens unit having a positive refractive power;

a second lens unit having a negative refractive power;

a third lens unit having a positive refractive power; and a rear lens group including at least one lens unit, in which the first lens unit is not configured to move for zooming, and the second lens unit, the third lens unit, and at least one lens unit included in the rear lens group are configured to move during zooming so that intervals between adjacent lens units are changed during zooming, in which the third lens unit includes at least two lens components, and a zoom position at which the third lens unit is positioned closest to the object side in a zoom range that satisfies the following conditional expression is defined as an intermediate zoom position:

$$0.2 \times M2t < M2m < 0.5 \times M2t,$$

where M2t represents a movement amount of the second lens unit during zooming from a wide angle end to a telephoto end, and M2m represents a movement amount of the second lens unit from the wide angle end, and in which the following conditional expressions are satisfied:

$$24.0 < \beta_{2t}/\beta_{2w} < 150.0;\ \text{and}$$

$$0.035 < M_{3m}/TD < 0.200,$$

where β2w represents a lateral magnification of the second lens unit at the wide angle end, β2t represents a lateral magnification of the second lens unit at the telephoto end, M3m represents a movement amount of the third lens unit during zooming from the wide angle end to the intermediate zoom position, and TD represents a total length of the zoom lens.

Further features of the present invention will become apparent from the following description of exemplary embodiments with reference to the attached drawings.

BRIEF DESCRIPTION OF THE DRAWINGS

FIG. 8C is a diagram for showing various aberrations at a second intermediate zoom position according to Embodiment 4.

FIG. 8D is a diagram for showing various aberrations at a telephoto end according to Embodiment 4.

DESCRIPTION OF THE EMBODIMENTS

Embodiments of the present invention are hereinafter described in detail with reference to the accompanying drawings. A zoom lens according to the present invention includes, in order from an object side to an image side, a first lens unit having a positive refractive power, a second lens unit having a negative refractive power, a third lens unit having a positive refractive power, and a rear lens group including at least one lens unit. Then, during zooming, the first lens unit is not configured to move, and the second lens unit, the third lens unit, and at least one lens unit included in the rear lens group are configured to move so that intervals between adjacent lens units are changed.

Figure 1:
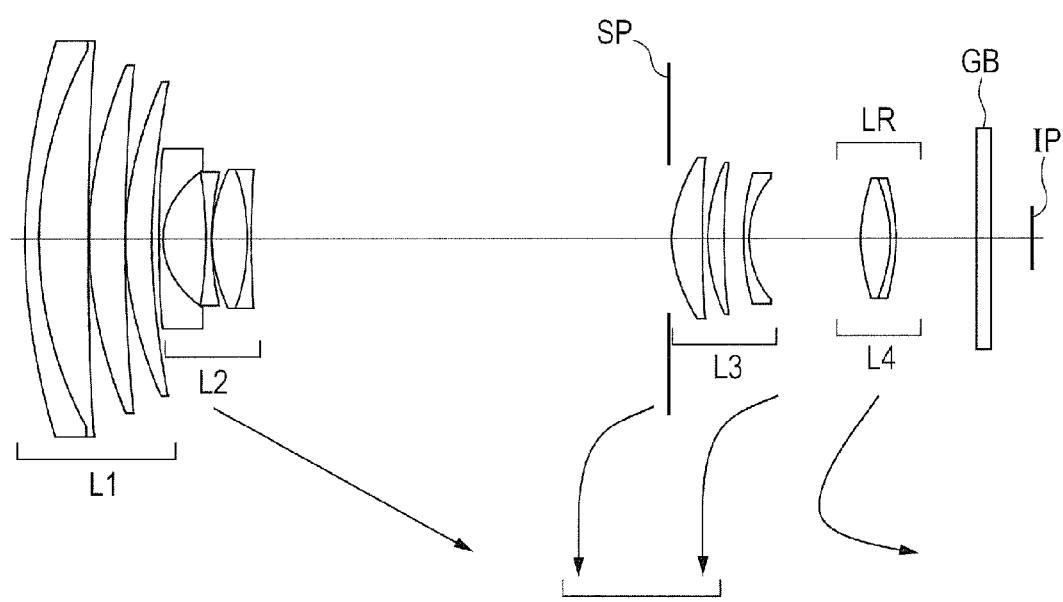
FIG. 1 is a lens cross-sectional view of the zoom lens at a wide angle end according to Embodiment 1 of the present invention.
Figure 2A:
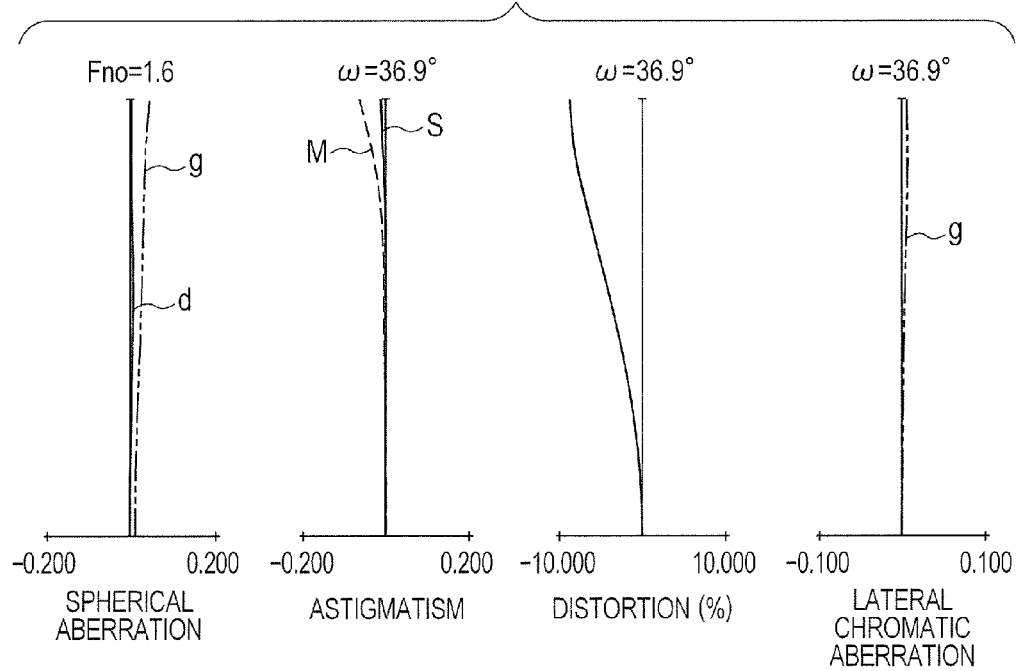
FIG. 2A is a diagram for showing various aberrations at the wide angle end according to Embodiment 1.
Figure 2B:
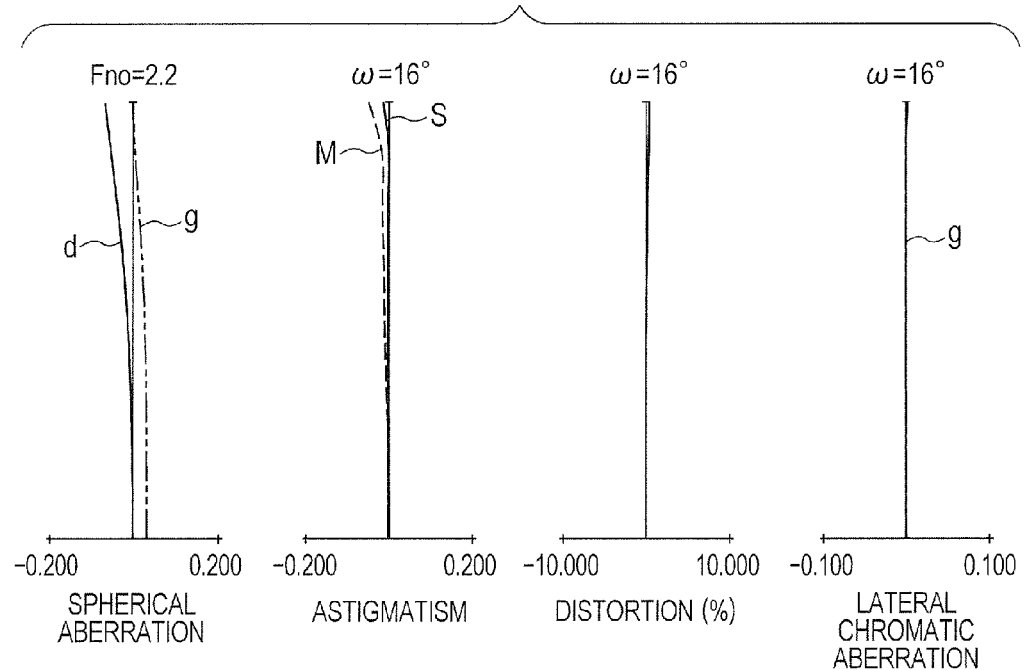
FIG. 2B is a diagram for showing various aberrations at a first intermediate zoom position according to Embodiment 1.
Figure 2C:
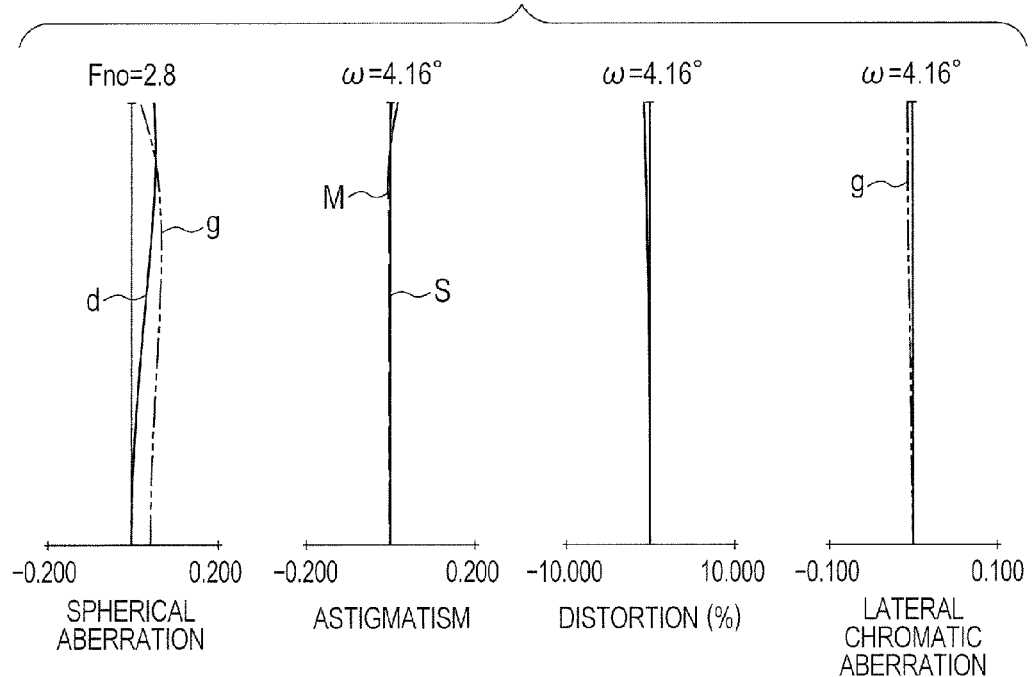
FIG. 2C is a diagram for showing various aberrations at a second intermediate zoom position according to Embodiment 1.
Figure 2D:
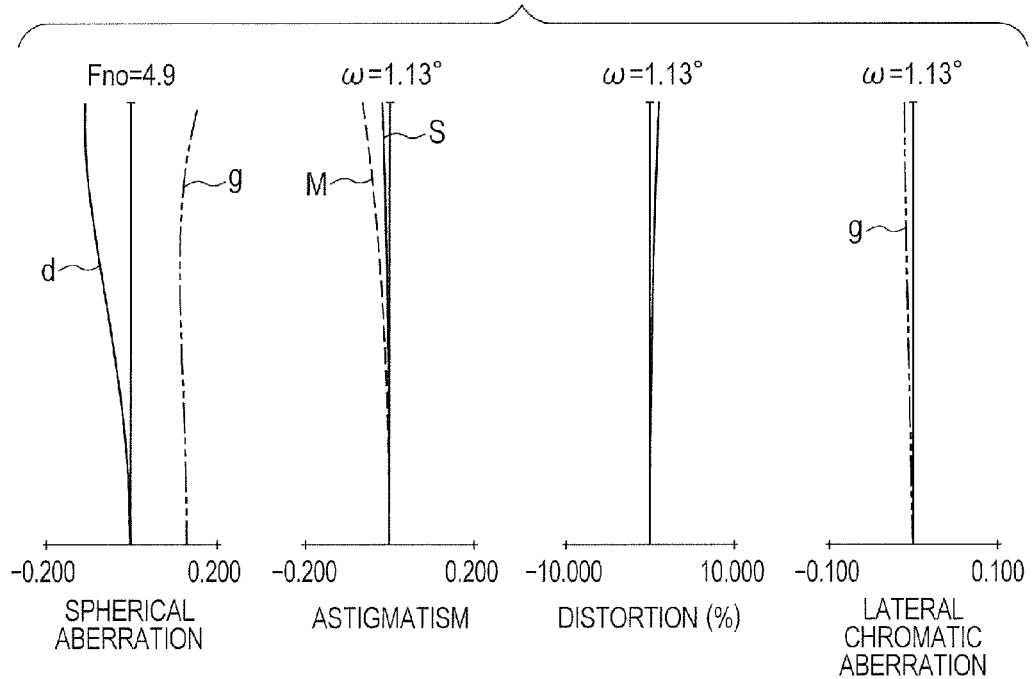
FIG. 2D is a diagram for showing various aberrations at a telephoto end according to Embodiment 1.

FIG. 1 is a lens cross-sectional view when focus is on an object at infinity at a wide angle end of Numerical Embodiment 1 corresponding to Embodiment 1 of the present invention. FIG. 2A, FIG. 2B, FIG. 2C, and FIG. 2D are longitudinal aberration diagrams when focus is on the object at infinity at the wide angle end (short focal length end), a first intermediate zoom position (intermediate zoom position), a second intermediate zoom position, and a telephoto end (long focal length end) in Numerical Embodiment 1, respectively. The term "first intermediate zoom position" as used herein refers to a zoom position defined based on an expression A, which is to be described later. Embodiment 1 relates to a zoom lens having a zoom ratio of 38.00 and an f-number of 1.60 to 4.90.

Figure 3:
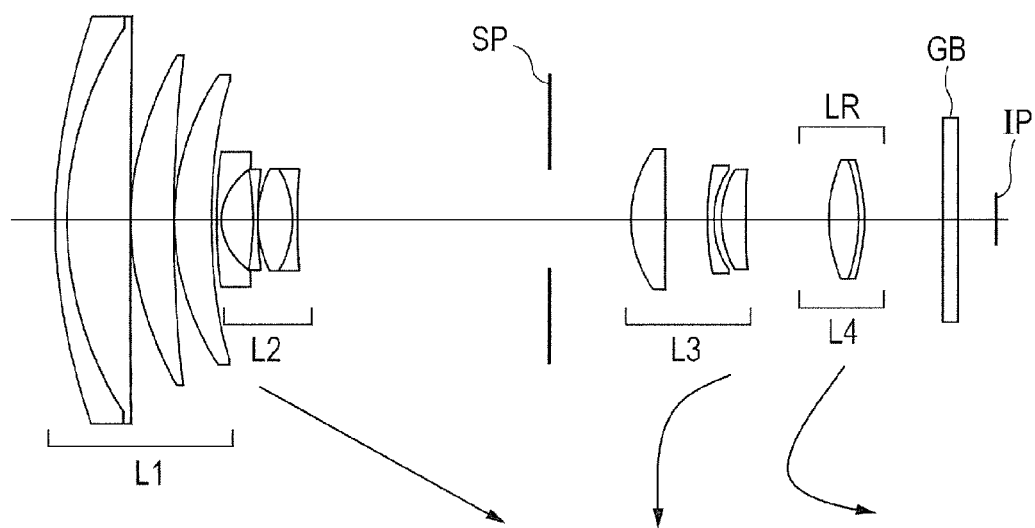
FIG. 3 is a lens cross-sectional view of the zoom lens at a wide angle end according to Embodiment 2 of the present invention.
Figure 4A:
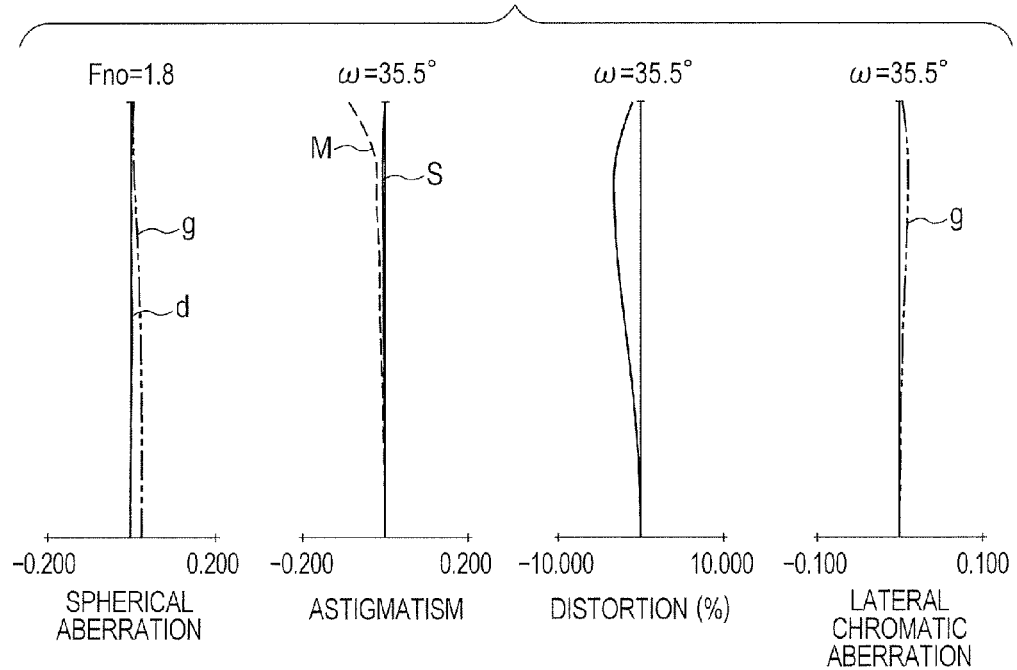
FIG. 4A is a diagram for showing various aberrations at the wide angle end according to Embodiment 2.
Figure 4B:
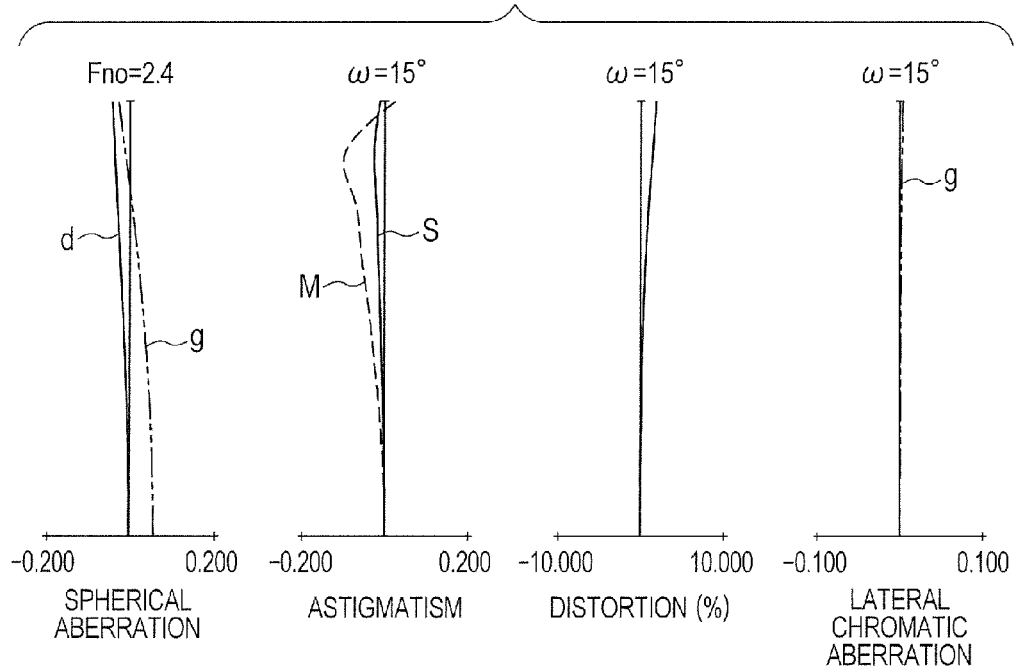
FIG. 4B is a diagram for showing various aberrations at a first intermediate zoom position according to Embodiment 2.
Figure 4C:
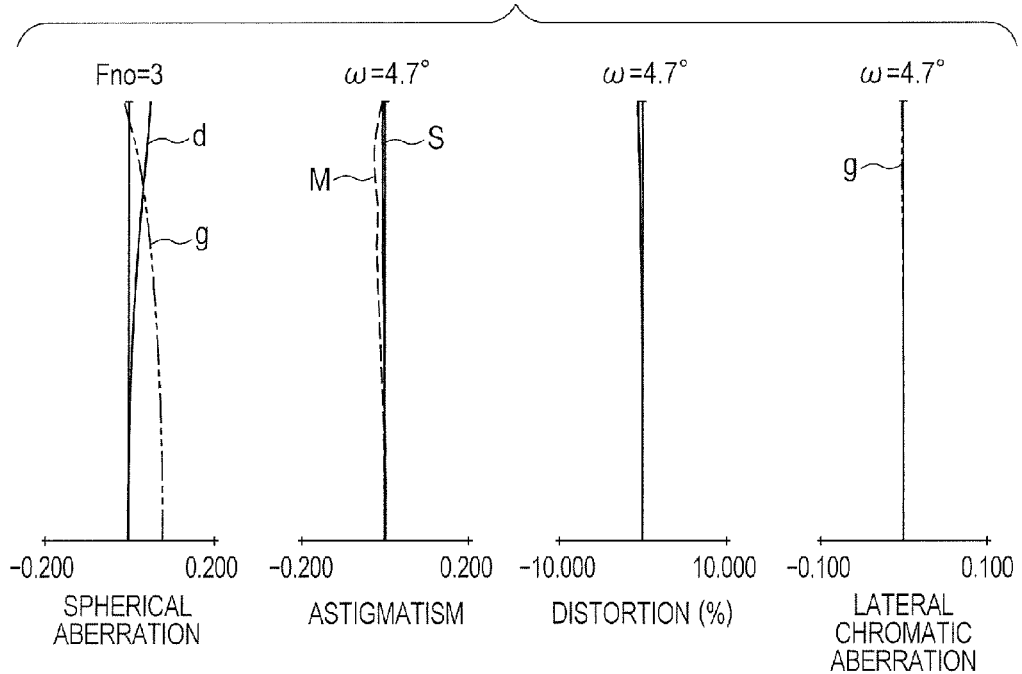
FIG. 4C is a diagram for showing various aberrations at a second intermediate zoom position according to Embodiment 2.
Figure 4D:
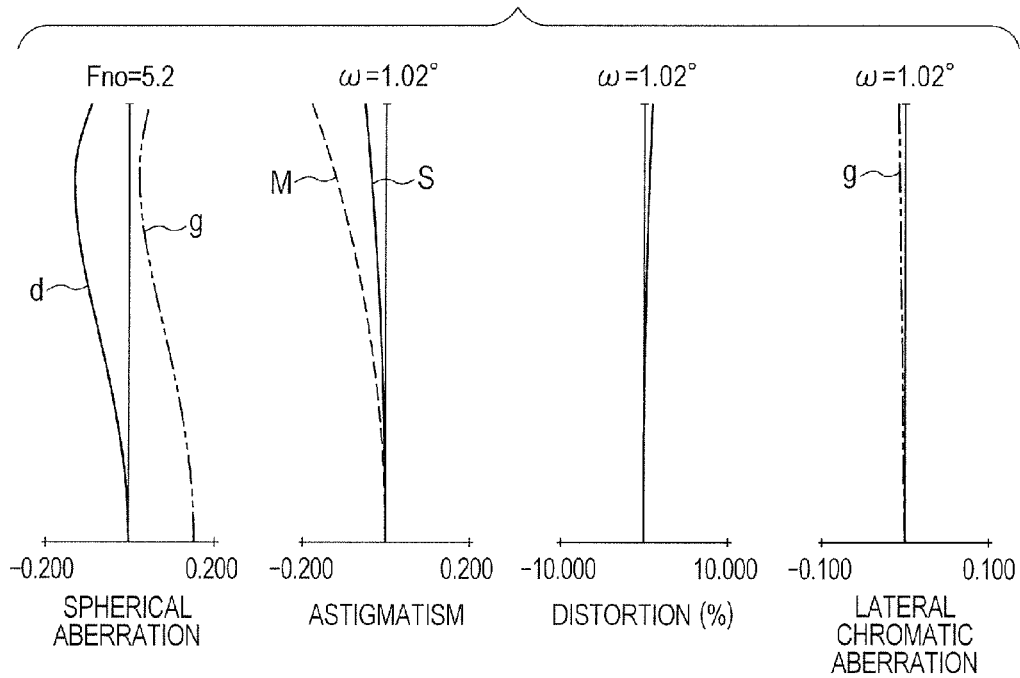
FIG. 4D is a diagram for showing various aberrations at a telephoto end according to Embodiment 2.

FIG. 3 is a lens cross-sectional view when focus is on an object at infinity at a wide angle end of Numerical Embodiment 2 corresponding to Embodiment 2 of the present invention. FIG. 4A, FIG. 4B, FIG. 4C, and FIG. 4D are longitudinal aberration diagrams when focus is on the object at infinity at the wide angle end, a first intermediate zoom position, a second intermediate zoom position, and a telephoto end in Numerical Embodiment 2, respectively. Embodiment 2 relates to a zoom lens having a zoom ratio of 40.0 and an f-number of 1.80 to 5.20.

Figure 5:
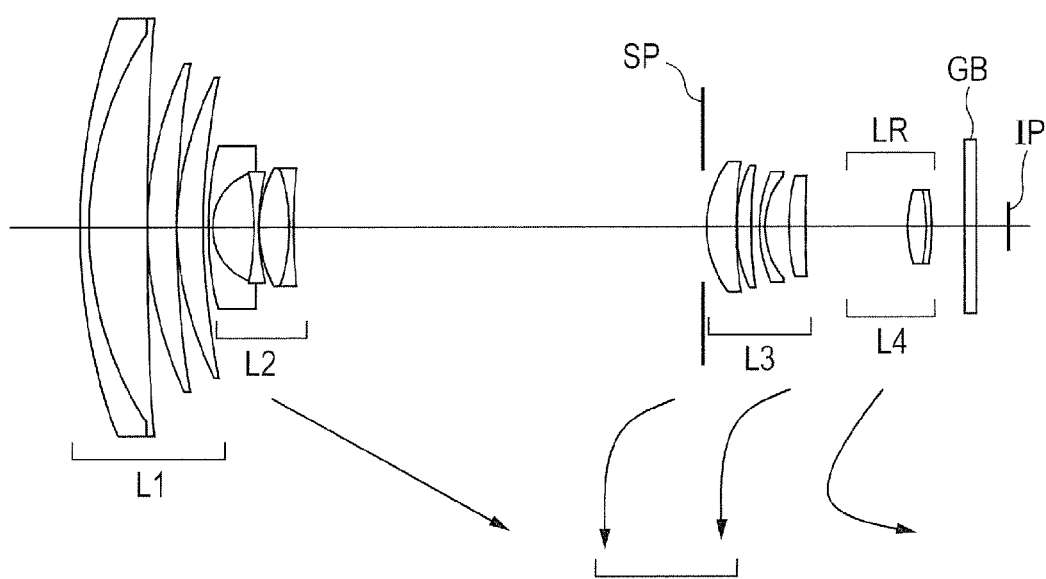
FIG. 5 is a lens cross-sectional view of the zoom lens at a wide angle end according to Embodiment 3 of the present invention.
Figure 6A:
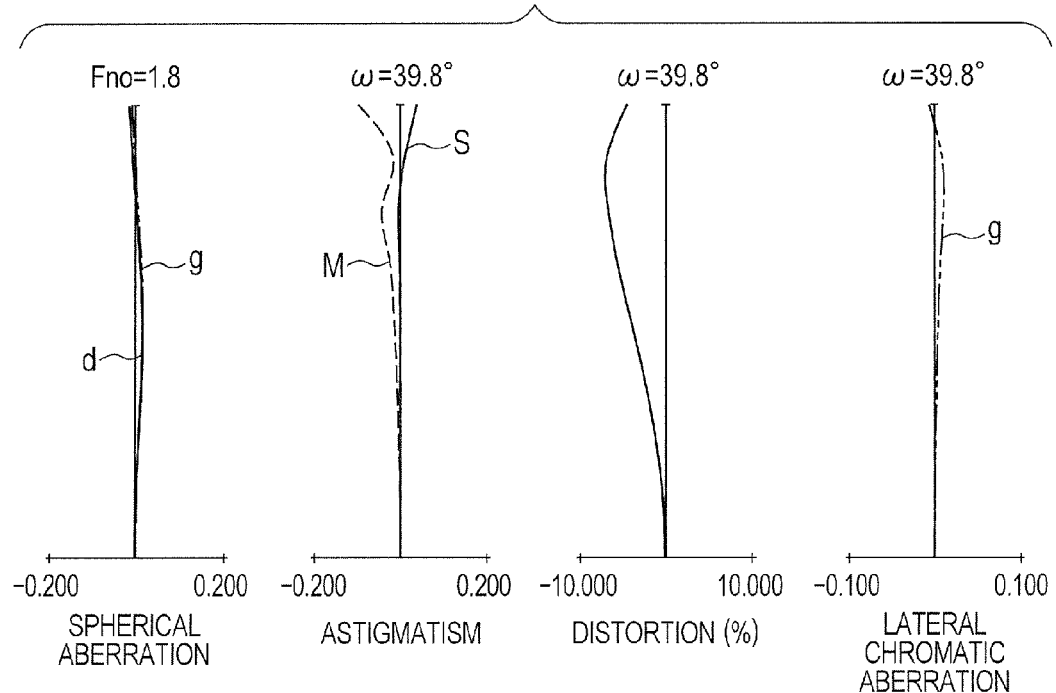
FIG. 6A is a diagram for showing various aberrations at the wide angle end according to Embodiment 3.
Figure 6B:
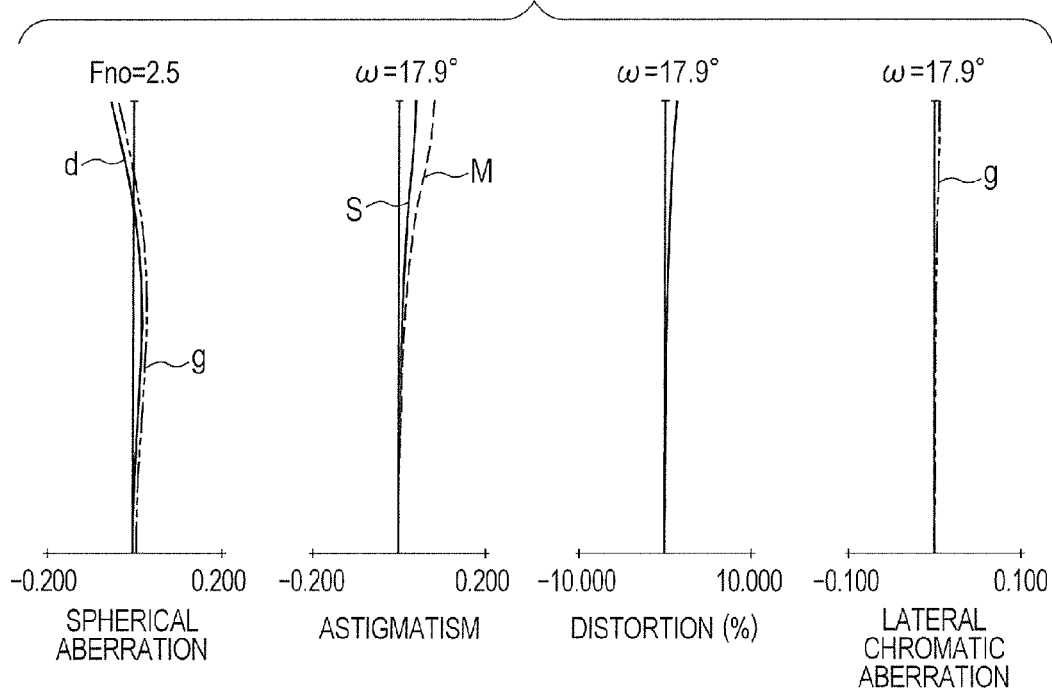
FIG. 6B is a diagram for showing various aberrations at a first intermediate zoom position according to Embodiment 3.
Figure 6C:
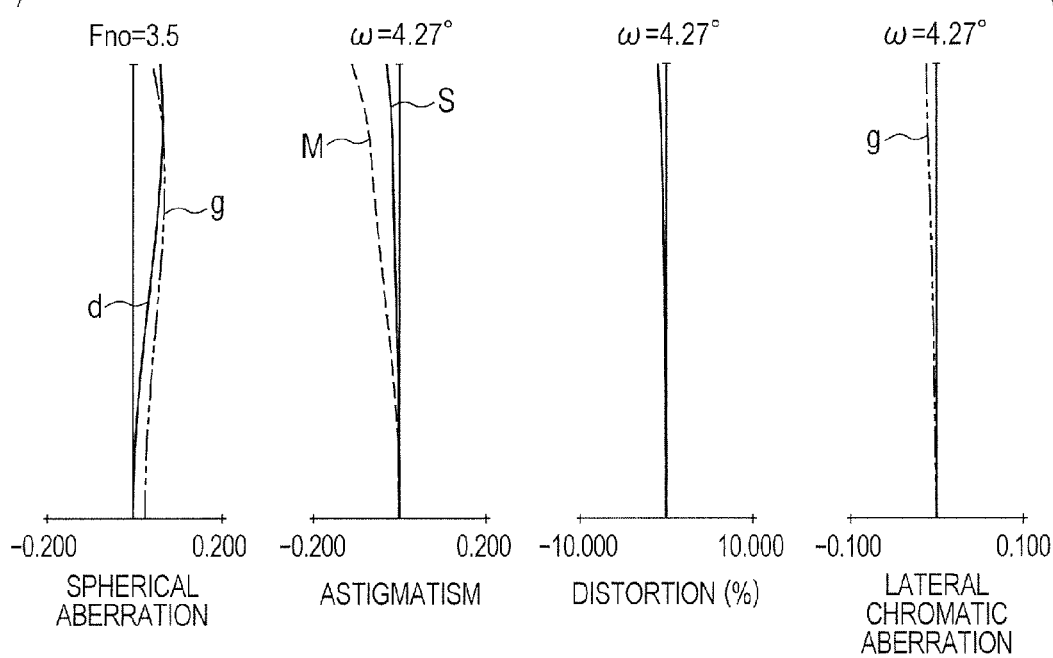
FIG. 6C is a diagram for showing various aberrations at a second intermediate zoom position according to Embodiment 3.
Figure 6D:
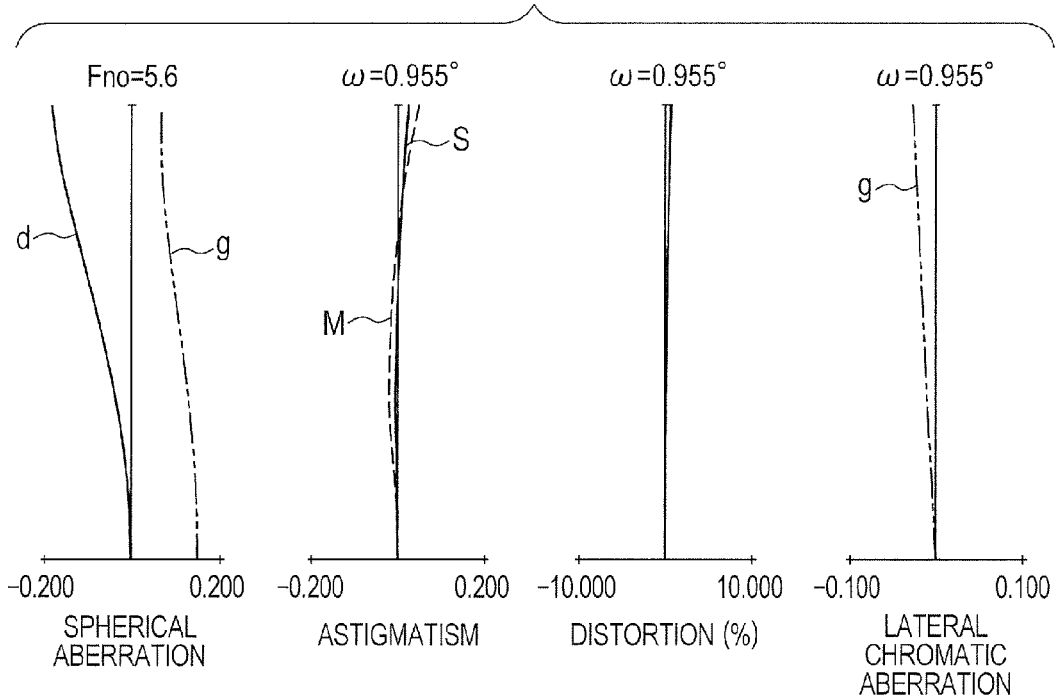
FIG. 6D is a diagram for showing various aberrations at a telephoto end according to Embodiment 3.

FIG. 5 is a lens cross-sectional view when focus is on an object at infinity at a wide angle end of Numerical Embodiment 3 corresponding to Embodiment 3 of the present invention. FIG. 6A, FIG. 6B, FIG. 6C, and FIG. 6D are longitudinal aberration diagrams when focus is on the object at infinity at the wide angle end, a first intermediate zoom position, a second intermediate zoom position, and a telephoto end in Numerical Embodiment 3, respectively. Embodiment 3 relates to a zoom lens having a zoom ratio of 49.99 and an f-number of 1.80 to 5.60.

Figure 7:
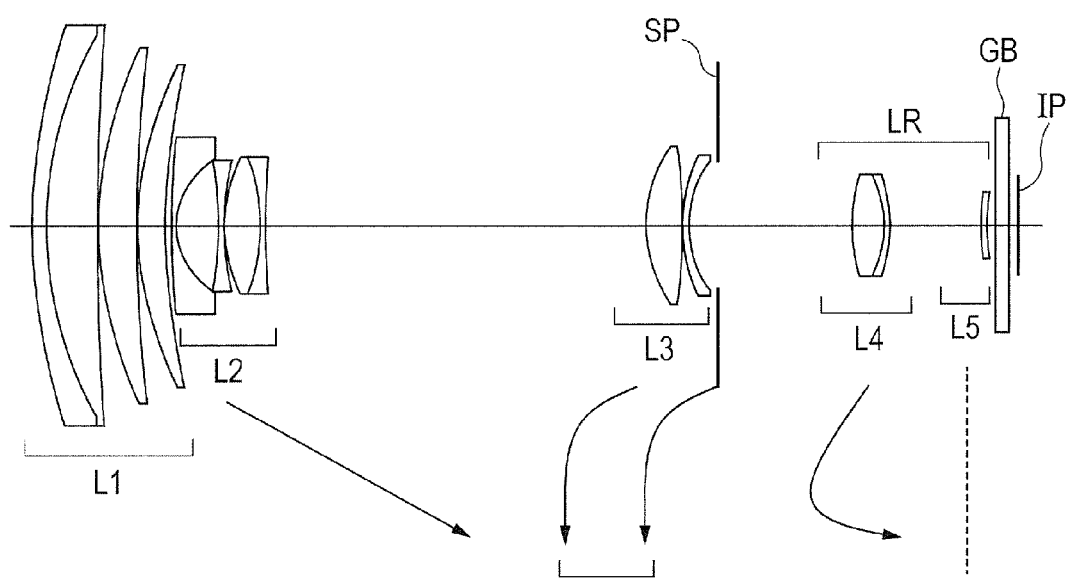
FIG. 7 is a lens cross-sectional view of the zoom lens at a wide angle end according to Embodiment 4 of the present invention.
Figure 8A:
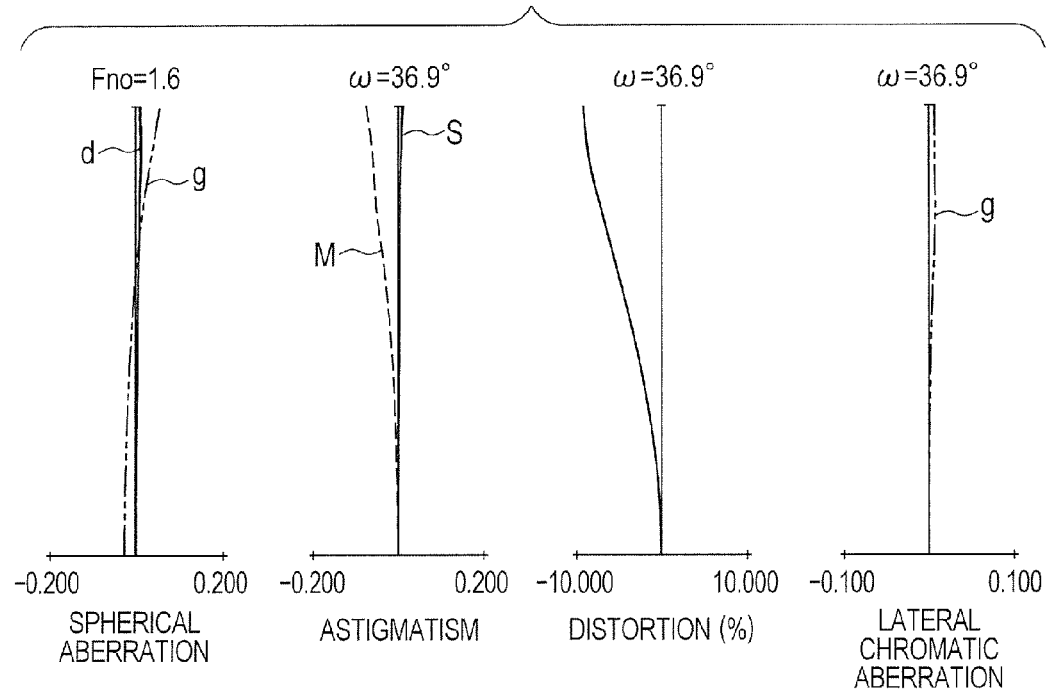
FIG. 8A is a diagram for showing various aberrations at the wide angle end according to Embodiment 4.
Figure 8B:
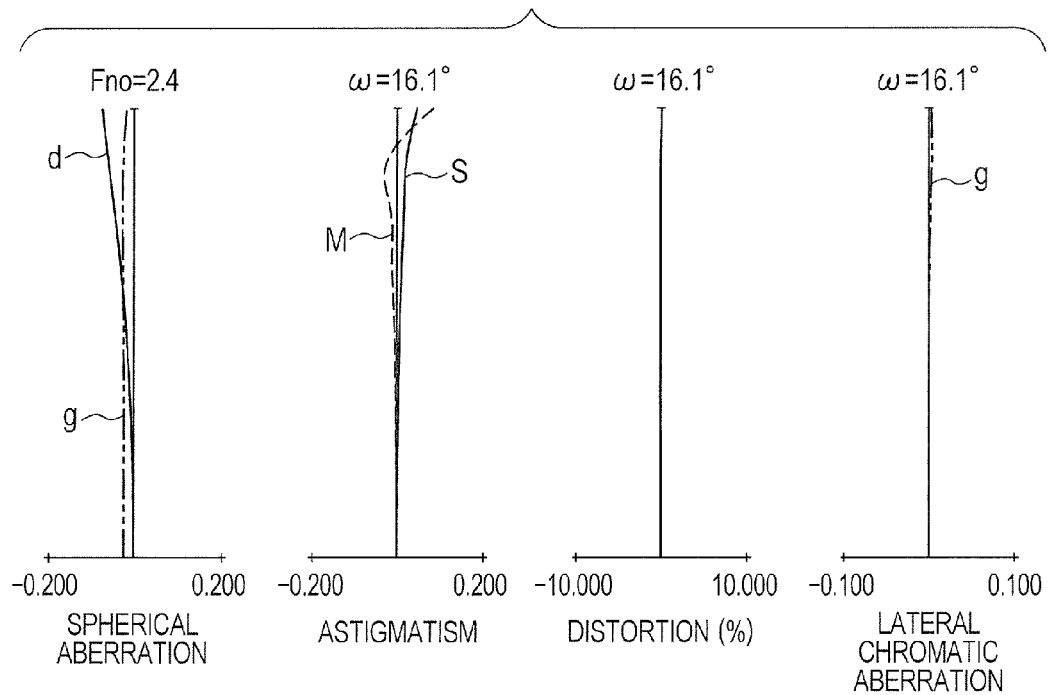
FIG. 8B is a diagram for showing various aberrations at a first intermediate zoom position according to Embodiment 4.

FIG. 7 is a lens cross-sectional view when focus is on an object at infinity at a wide angle end of Numerical Embodiment 4 corresponding to Embodiment 4 of the present invention. FIG. 8A, FIG. 8B, FIG. 8C, and FIG. 8D are longitudinal aberration diagrams when focus is on the object at infinity at the wide angle end, a first intermediate zoom position, a second intermediate zoom position, and a telephoto end in Numerical Embodiment 4, respectively. Embodiment 4 relates to a zoom lens having a zoom ratio of 40.0 and an f-number of 1.60 to 5.00.

Figure 9:
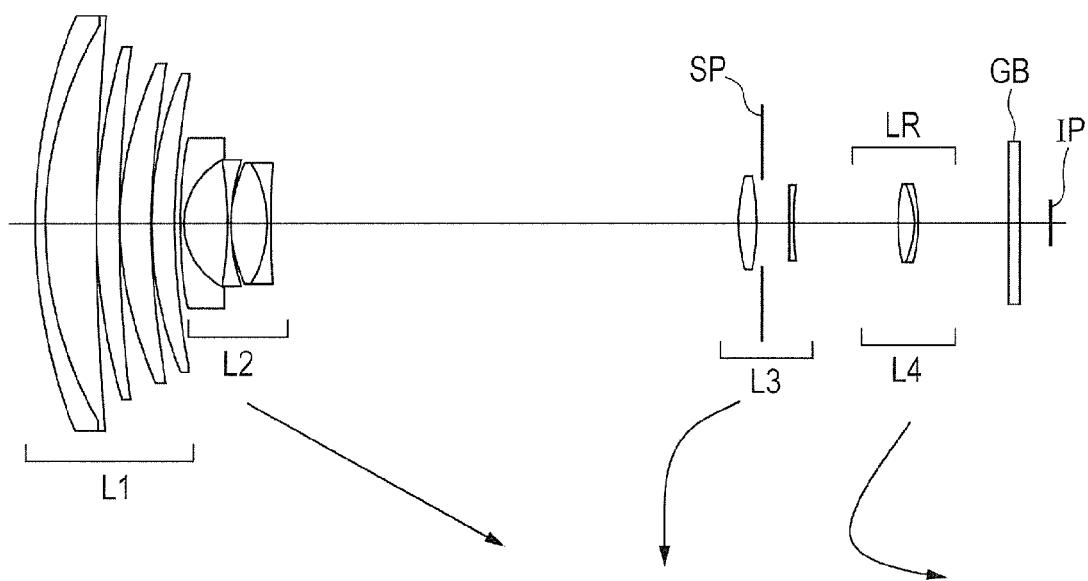
FIG. 9 is a lens cross-sectional view of the zoom lens at a wide angle end according to Embodiment 5 of the present invention.
Figure 10A:
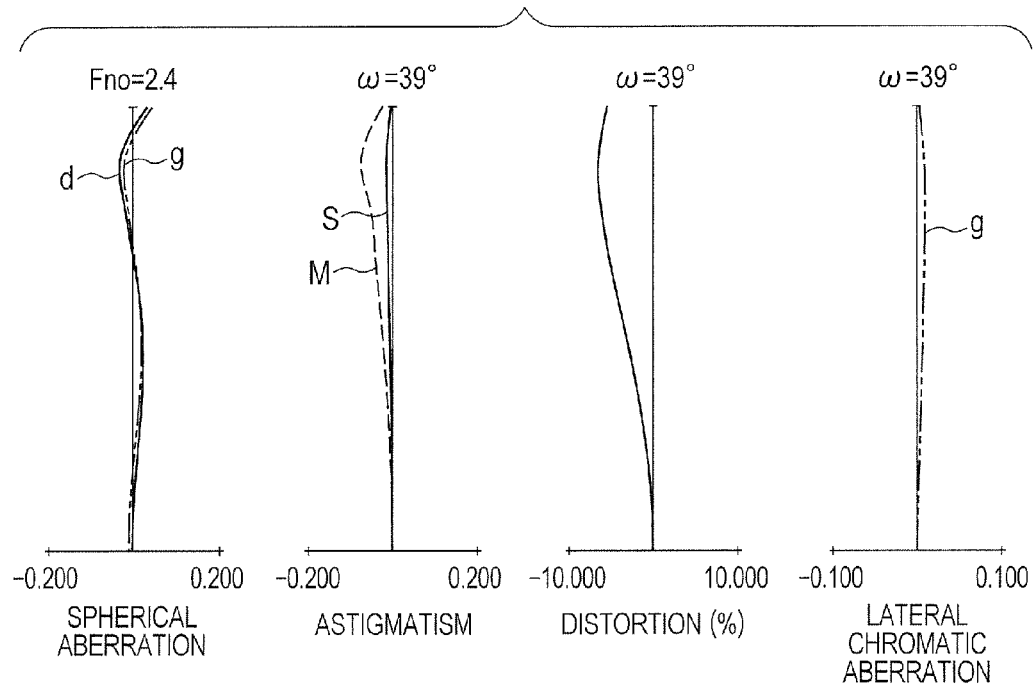
FIG. 10A is a diagram for showing various aberrations at the wide angle end according to Embodiment 5.
Figure 10B:
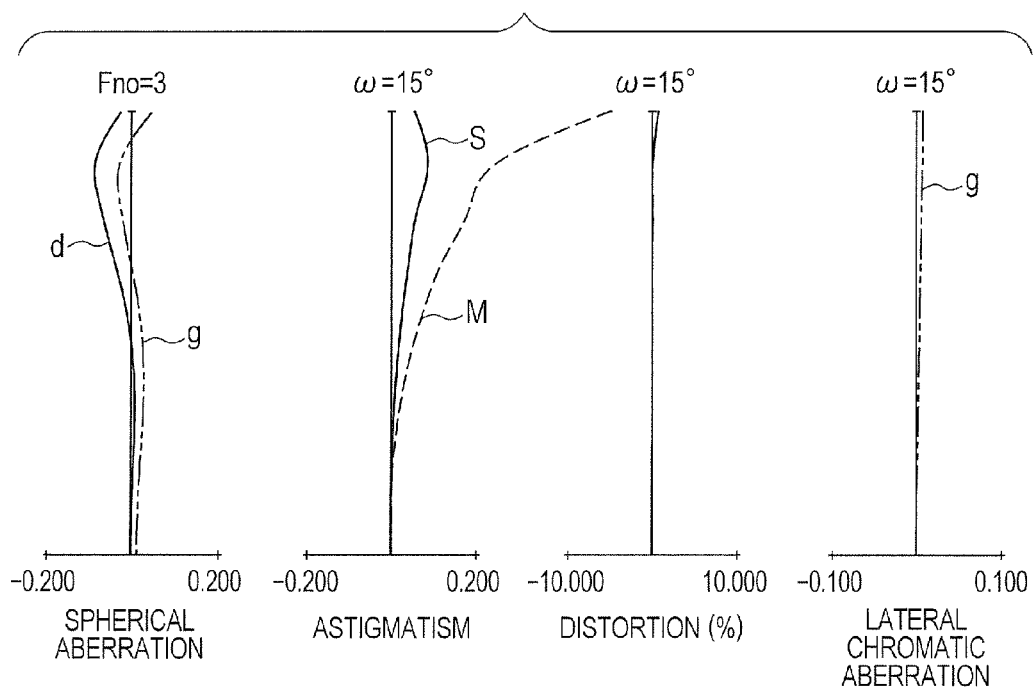
FIG. 10B is a diagram for showing various aberrations at a first intermediate zoom position according to Embodiment 5.
Figure 10C:
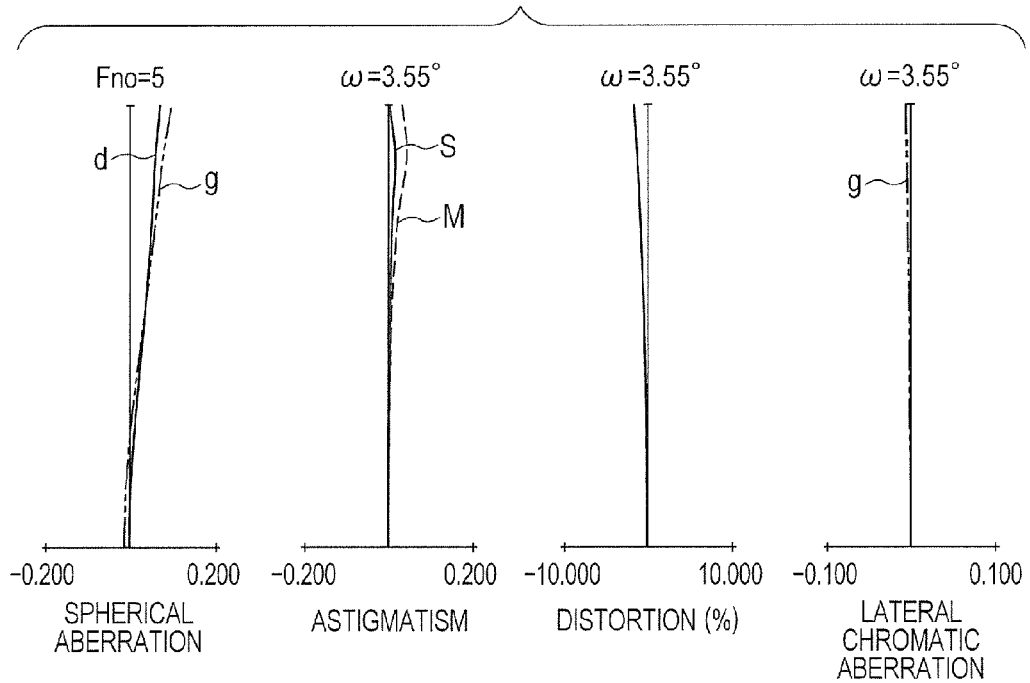
FIG. 10C is a diagram for showing various aberrations at a second intermediate zoom position according to Embodiment 5.
Figure 10D:
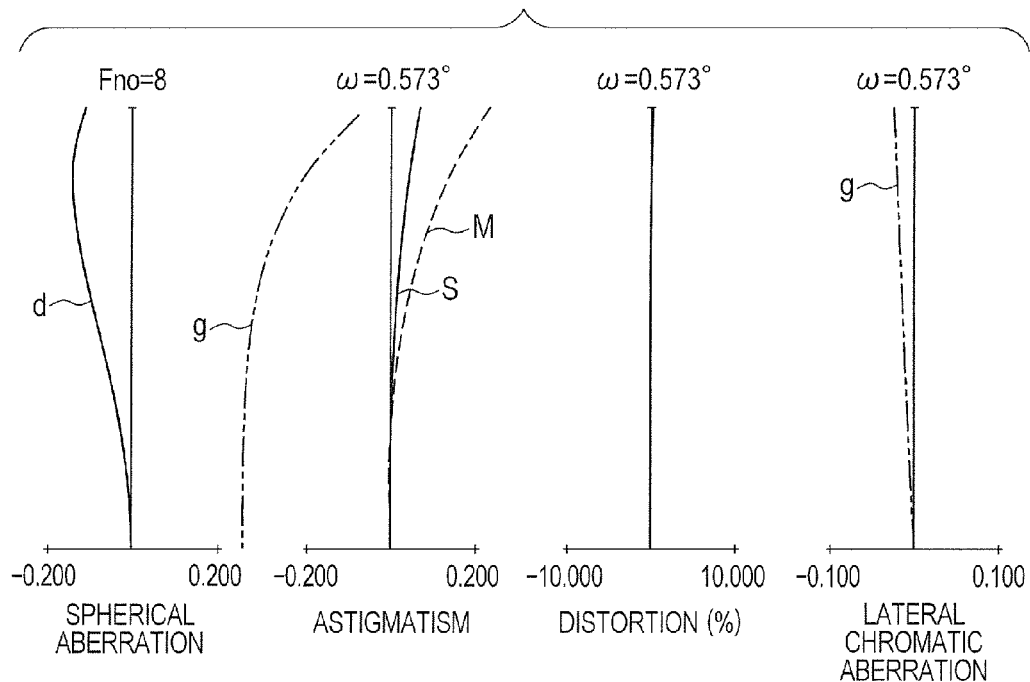
FIG. 10D is a diagram for showing various aberrations at a telephoto end according to Embodiment 5.

FIG. 9 is a lens cross-sectional view when focus is on an object at infinity at a wide angle end of Numerical Embodiment 5 corresponding to Embodiment 5 of the present invention. FIG. 10A, FIG. 10B, FIG. 10C, and FIG. 10D are longitudinal aberration diagrams when focus is on the object at infinity at the wide angle end, a first intermediate zoom position, a second intermediate zoom position, and a telephoto end in Numerical Embodiment 5, respectively. Embodiment 5 relates to a zoom lens having a zoom ratio of 81.05 and an f-number of 2.40 to 8.00.

Figure 11:
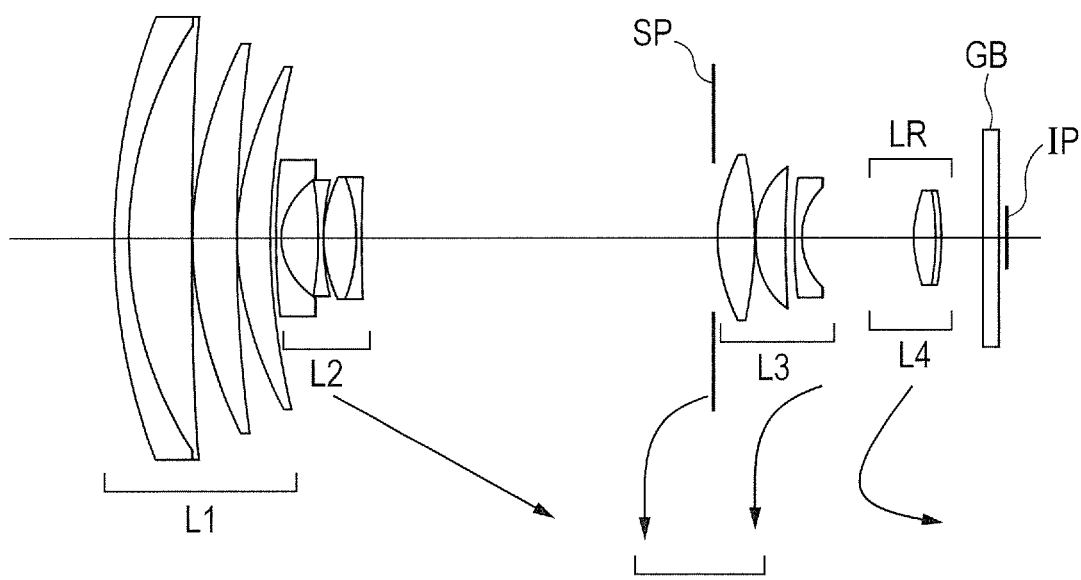
FIG. 11 is a lens cross-sectional view of the zoom lens at a wide angle end according to Embodiment 6 of the present invention.
Figure 12A:
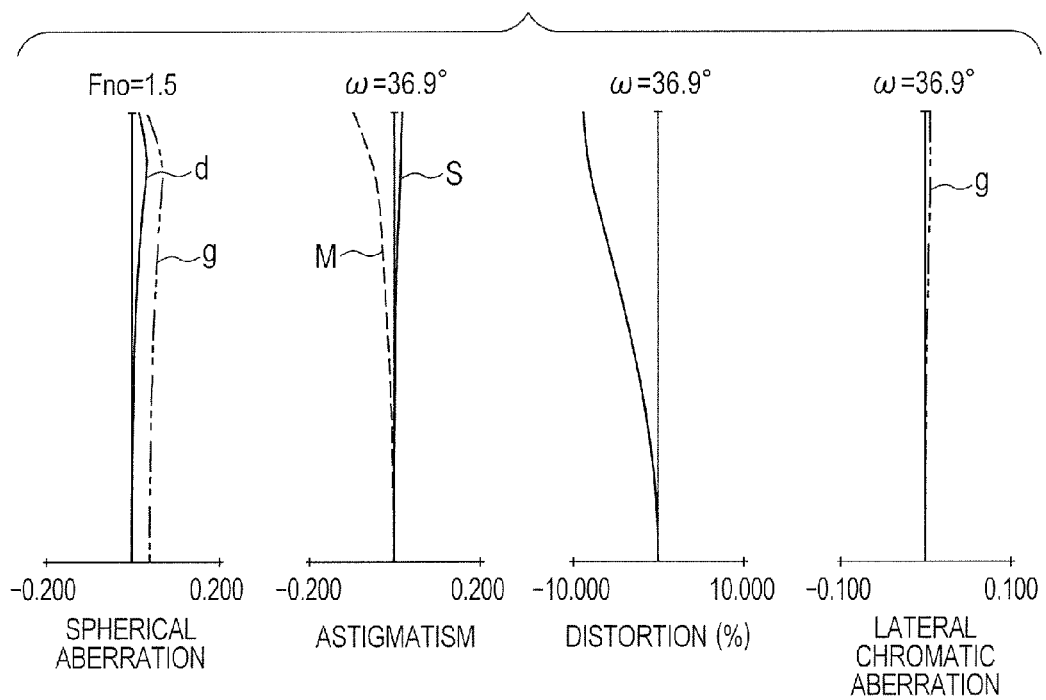
FIG. 12A is a diagram for showing various aberrations at the wide angle end according to Embodiment 6.
Figure 12B:
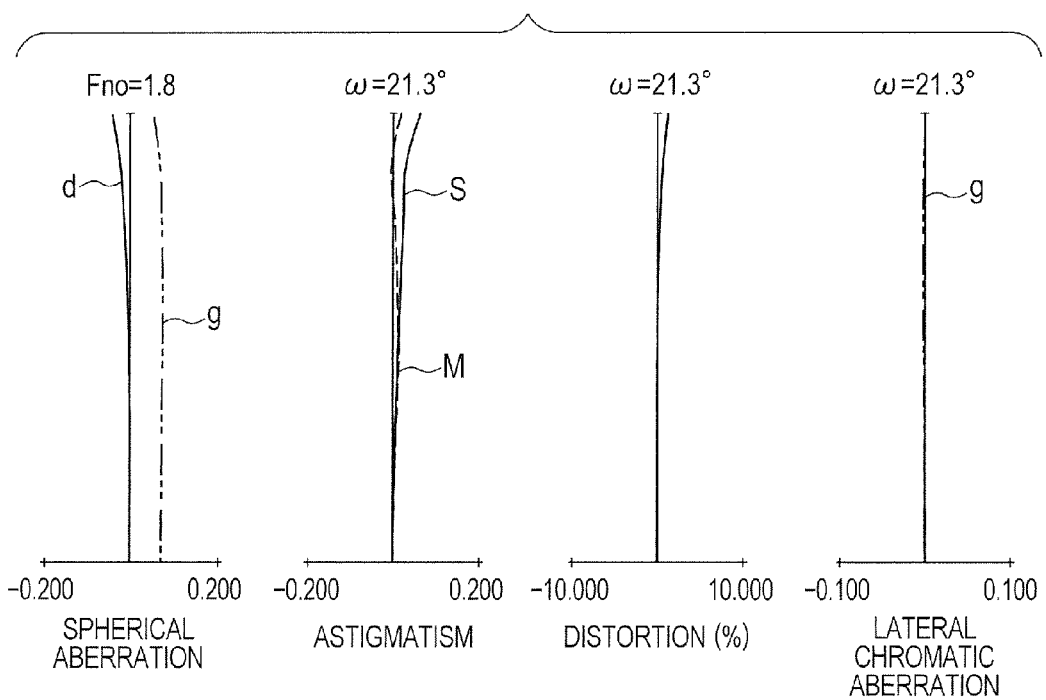
FIG. 12B is a diagram for showing various aberrations at a first intermediate zoom position according to Embodiment 6.
Figure 12C:
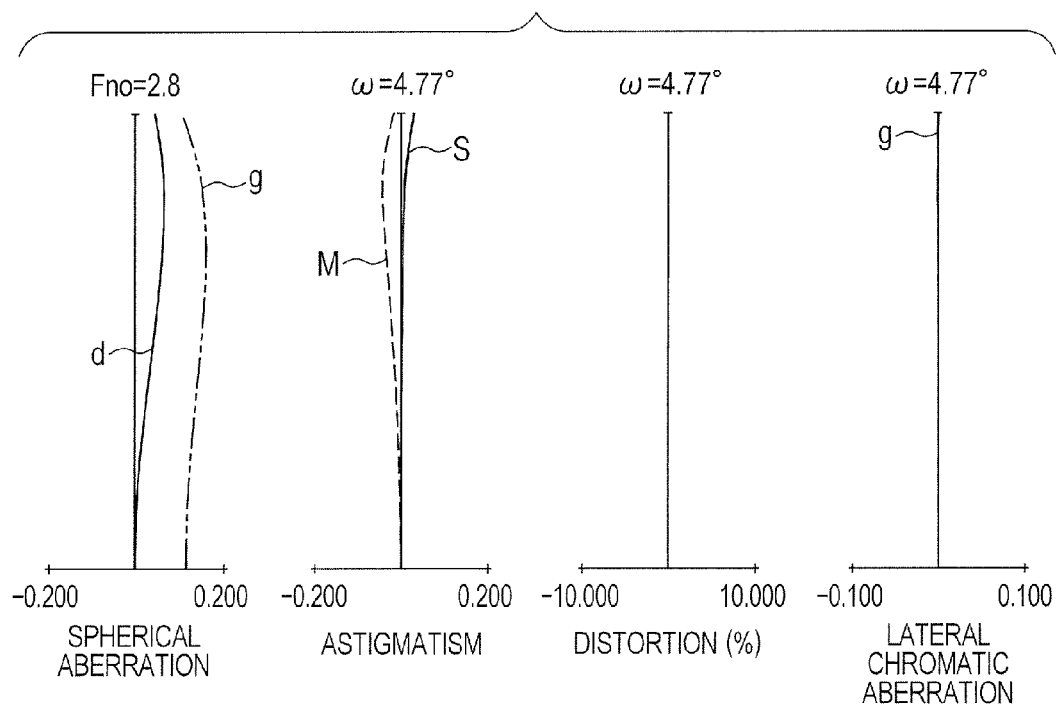
FIG. 12C is a diagram for showing various aberrations at a second intermediate zoom position according to Embodiment 6.
Figure 12D:
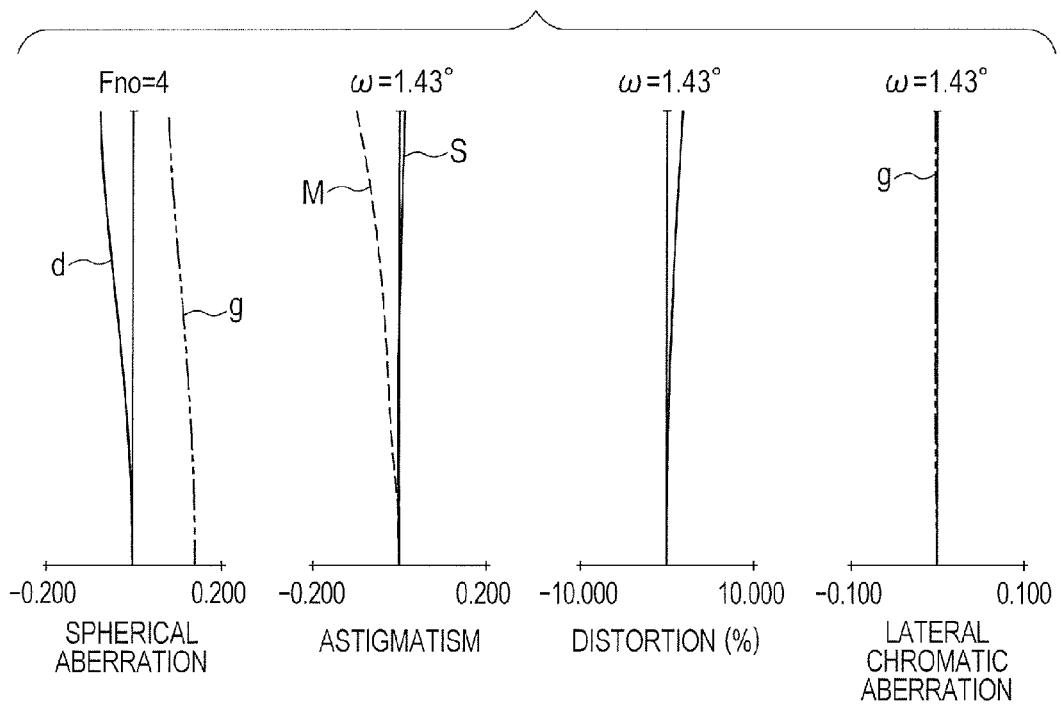
FIG. 12D is a diagram for showing various aberrations at a telephoto end according to Embodiment 6.
Figure 13:
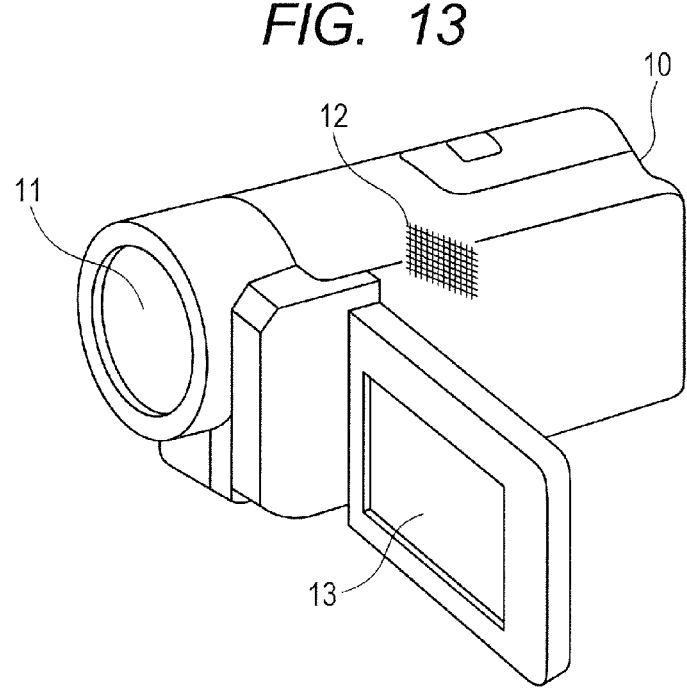
FIG. 13 is a schematic view of a main part of an image pickup apparatus according to the present invention.
Figure 14:
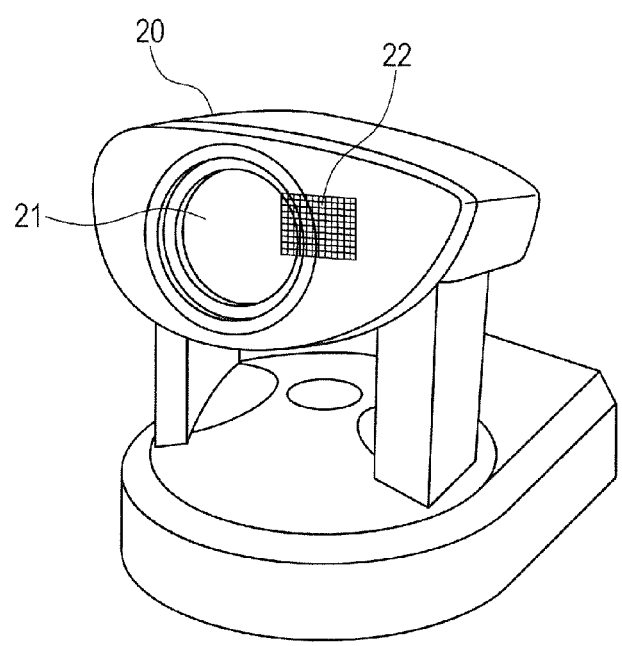
FIG. 14 is a schematic view of a main part of an image pickup apparatus according to the present invention.

FIG. 11 is a lens cross-sectional view when focus is on an object at infinity at a wide angle end of Numerical Embodiment 6 corresponding to Embodiment 6 of the present invention. FIG. 12A, FIG. 12B, FIG. 12C, and FIG. 12D are longitudinal aberration diagrams when focus is on the object at infinity at the wide angle end, a first intermediate zoom position, a second intermediate zoom position, and a telephoto end in Numerical Embodiment 6, respectively. Embodiment 6 relates to a zoom lens having a zoom ratio of 30.0 and an f-number of 1.50 to 4.00. FIG. 13 and FIG. 14 are each a schematic view of a main part of an embodiment of an image pickup apparatus according to the present invention.

The zoom lens according to the present invention is to be used in an image pickup apparatus such as a digital camera, a video camera, or a silver-halide film camera. In the lens cross-sectional views, the left side is a front side (object side, enlarging side), and the right side is a rear side (image side, reducing side). In the lens cross-sectional views, the order of each of the lens units from the object side to the image side is indicated by i, and the i-th lens unit is indicated by Li. A rear lens group LR includes at least one lens unit.

Next, features of the zoom lens in each of Embodiments are described. In the lens cross-sectional views of Embodiments, a first lens unit having a positive refractive power, a second lens unit having a negative refractive power, a third lens unit having a positive refractive power, a fourth lens unit having a positive refractive power, and a fifth lens unit having a negative refractive power are denoted by L1, L2, L3, L4, and L5, respectively. An f-number determining member (hereinafter, also referred to as "aperture stop"), which functions as an aperture stop configured to determine (restrict) an open f-number (Fno) beam is denoted by SP.

An optical block GB corresponds to an optical filter, a face plate, a crystal low-pass filter, an infrared cut filter, or the like. An image plane IP corresponds to an image pickup surface of an image pickup element (photoelectric converting element) such as a CCD sensor and a CMOS sensor when the zoom lens is used as a photographing optical system of a video camera or a digital still camera. Alternatively, the image plane IP corresponds to a photosensitive surface corresponding to a film surface when the zoom lens is used as a photographing optical system of a silver-halide film camera.

In the lens cross-sectional views, the arrows indicate movement loci of the lens units during zooming from the wide angle end to the telephoto end. The second lens unit L2, the third lens unit L3, and the fourth lens unit L4 are configured to move during zooming. The fourth lens unit L4 is configured to move during focusing from infinity to short distance.

Of the longitudinal aberration diagrams, in the spherical aberration, a d-line (wavelength: 587.6 nm) and a g-line (wavelength: 435.8 nm) are represented by d and g, respectively. In the astigmatism, a meridional image plane (broken line) of the d-line and a sagittal image plane (solid line) of the d-line are represented by M and S, respectively. Moreover, in the diagram for showing a distortion, a distortion of the d-line is shown. In the lateral chromatic aberration, a lateral chromatic aberration of the g-line with respect to the d-line is shown. An f-number and a photographing half angle of field (degrees) are represented by Fno and ω, respectively. In the longitudinal aberration diagrams, the spherical aberration, the astigmatism, the distortion, and the lateral chromatic aberration are drawn on the scales of 0.2 mm, 0.2 mm, 10%, and 0.1 mm, respectively.

The zoom lens of each of Embodiments includes, in order from the object side to the image side, a first lens unit L1 having a positive refractive power, a second lens unit L2 having a negative refractive power, a third lens unit L3 having a positive refractive power, and a rear lens group LR including at least one lens unit. During zooming, the first lens unit L1 is not configured to move, and the second lens unit L2, the third lens unit L3, and at least one lens unit included in the rear lens group LR are configured to move so that intervals between adjacent lens units are changed.

More specifically, during zooming from the wide angle end to the telephoto end, an interval between the first lens unit L1 and the second lens unit L2 is increased, an interval between the second lens unit L2 and the third lens unit L3 is reduced, and an interval between the third lens unit L3 and the rear lens group LR is increased. The third lens unit L3 includes at least two lens components. The term "lens component" as used herein refers to a component including a single lens or a cemented lens. The third lens unit L3 includes the at least two lens components to have a large number of lens surfaces for correcting various aberrations.

In each of Embodiments, the third lens unit L3, which is configured to move during zooming, has the large number of lens surfaces for correcting the various aberrations to reduce variations in aberrations during zooming. A lateral magnification of the second lens unit L2 at the wide angle end is represented by $\beta 2w$. A lateral magnification of the second lens unit L2 at the telephoto end is represented by $\beta 2t$.

A movement amount of the third lens unit L3 during zooming from the wide angle end to the telephoto end is represented by M3t, and a total length of the zoom lens is represented by TD. The term "total length of the zoom lens" as used herein refers to a value obtained by adding air-equivalent back focus BF to a distance from the first lens surface to the last lens surface. Moreover, the phrase "movement amount of the lens unit during zooming from the wide angle end to the telephoto end" refers to a difference between a position of the lens unit on an optical axis at the wide angle end and a position of the lens unit on the optical axis at the telephoto end. The sign of the movement amount is positive when the lens unit is positioned closer to the object side at the telephoto end than at the wide angle end, and is negative when the lens unit is positioned closer to the image side at the telephoto end than at the wide angle end.

In this case, the following conditional expressions are satisfied.

$$20.0 < \beta 2t/\beta 2w < 150.0 \quad (1)$$

$$0.01 < M3t/TD < 0.20 \quad (2)$$

Next, the technical meanings of the above-mentioned conditional expressions are described.

The conditional expression (1) defines a ratio between the lateral magnifications of the second lens unit L2 at the wide angle end and the telephoto end. When the ratio between the lateral magnifications falls below the lower limit value of the conditional expression (1), it becomes difficult to have a sufficient zoom ratio by the second lens unit L2, resulting in a difficulty realizing a high zoom ratio. On the other hand, when the ratio between the lateral magnifications exceeds the upper limit value of the conditional expression (1), the lateral magnification of the second lens unit L2 becomes too large at the telephoto end, and a movement of an image forming position of the second lens unit L2 becomes too large with respect to a movement of the second lens unit L2 toward an optical axis direction. In other words, a focus sensitivity of the second lens unit L2 becomes too high, and hence it becomes difficult to control driving of the second lens unit L2 as the zoom lens.

The conditional expression (2) defines a ratio between the movement amount of the third lens unit L3 during zooming from the wide angle end to the telephoto end and the total length of the zoom lens.

When the ratio falls below the lower limit value of the conditional expression (2) and the movement amount of the third lens unit L3 during zooming from the wide angle end to the telephoto end becomes too small, the third lens unit L3 cannot have a sufficient lateral magnification, and hence it becomes difficult to obtain the high zoom ratio. Moreover, when the ratio falls below the lower limit value of the conditional expression (2), in realizing the high zoom ratio, a lateral magnification held by the second lens unit L2 becomes too large, with the result that a change in focus position due to the movement of the second lens unit L2 becomes large, and hence the focus sensitivity of the second lens unit L2 becomes too high, which is not preferred.

On the other hand, when the ratio exceeds the upper limit value of the conditional expression (2), and hence the movement amount of the third lens unit L3 during zooming from the wide angle end to the telephoto end becomes too large, it becomes difficult to secure a sufficiently long movement amount of the second lens unit L2, which is a main magnification-varying lens unit. Consequently, it becomes difficult to realize the high zoom ratio while downsizing the entire system.

In each of Embodiments, the above-mentioned configuration is adopted to obtain a zoom lens that is small in size as the entire system, has the high zoom ratio, and is reduced in focus sensitivity of the second lens unit L2 at the telephoto end.

In each of Embodiments, it is more preferred to satisfy at least one of the conditions provided below. A lateral magnification of the third lens unit L3 at the wide angle end is represented by $\beta 3w$, and a lateral magnification of the third lens unit L3 at the telephoto end is represented by $\beta 3t$. An interval on the optical axis between the first lens unit L1 and the second lens unit L2 at the wide angle end is represented by L1w. A focal length of the first lens unit L1 is represented by f1. A focal length of the second lens unit L2 is represented by f2. A focal length of the third lens unit L3 is represented by f3.

Then, it is preferred to satisfy at least one of the following conditional expressions.

$$0.20 < \beta 3t/\beta 3w < 2.00 \quad (3)$$

$$0.001 < L1w/TD < 0.020 \quad (4)$$

$$-10.0 < f1/f2 < -5.0 \quad (5)$$

$$1.0 < f1/f3 < 4.0 \quad (6)$$

Next, the technical meanings of the above-mentioned conditional expressions are described.

The conditional expression (3) defines a ratio between the lateral magnification of the third lens unit L3 at the wide angle end and the lateral magnification of the third lens unit L3 at the telephoto end. When the ratio between the lateral magnifications falls below the lower limit value of the conditional expression (3), it becomes difficult to have a sufficient lateral magnification by the third lens unit L3, resulting in a difficulty realizing the high zoom ratio. Moreover, when the high zoom ratio is to be realized while the ratio falls below the lower limit value of the conditional expression (3), the lateral magnification held by the second lens unit L2 becomes too large, and hence the focus sensitivity of the second lens unit L2 becomes too high, which is not preferred.

On the other hand, when the ratio between the lateral magnifications exceeds the upper limit value of the conditional expression (3), the lateral magnification of the third lens unit L3 becomes too large, and the lateral magnification of the second lens unit L2, which is the main magnification-varying lens unit, becomes small, and hence it becomes difficult to realize the high zoom ratio while downsizing the entire system.

The conditional expression (4) defines a ratio between the interval on the optical axis between the first lens unit L1 and the second lens unit L2 at the wide angle end, and the total length of the zoom lens. When the ratio falls below the lower limit value of the conditional expression (4), and hence the interval between the first lens unit L1 and the second lens unit L2 becomes too short, the first lens unit L1 and the second lens unit L2 may interfere with each other when an impact is applied from the outside at the wide angle end, to thereby produce scratches on lenses surfaces. The scratches on the lens surfaces cause ghost and flare, which is not preferred.

When the ratio exceeds the upper limit value of the conditional expression (4), and hence the interval between the first lens unit L1 and the second lens unit L2 becomes too long, a beam that forms an image at the maximum image height at the wide angle end passes through a position that is away from the optical axis in the first lens unit, which disadvantageously increases a size of the first lens unit.

Consequently, it becomes difficult to downsize the entire system of the zoom lens, which is not preferred.

The conditional expression (5) defines a ratio between the focal length of the first lens unit L1 and the focal length of the second lens unit L2. When the ratio falls below the lower limit value of the conditional expression (5), an absolute value of a negative focal length of the second lens unit L2, which is configured to move during zooming, becomes too small, that is, an absolute value of the negative refractive power becomes too large, which increases variations in various aberrations during zooming. As a result, it becomes difficult to obtain a high optical characteristic over the entire zoom range.

On the other hand, when the ratio exceeds the upper limit value, a positive focal length of the first lens unit L1 becomes too small, that is, the positive refractive power becomes too strong, which requires a combined lateral magnification of the second lens unit L2 and the subsequent lens units to be large at the telephoto end in order to attain the high zoom ratio. Then, the various aberrations that have occurred in the first lens unit L1 are significantly enlarged, and hence it becomes difficult to obtain the high optical characteristic at the telephoto end.

The conditional expression (6) defines a ratio between the focal length of the first lens unit L1 and the focal length of the third lens unit. When the ratio falls below the lower limit value of the conditional expression (6), and hence the positive focal length of the first lens unit L1 becomes too short, the combined lateral magnification of the second lens unit L2 and the subsequent lens system is required to be large at the telephoto end in order to attain the high zoom ratio. Then, the various aberrations that have occurred in the first lens unit L1 are significantly enlarged, and hence it becomes difficult to obtain the high optical characteristic at the telephoto end.

On the other hand, when the ratio exceeds the upper limit value, a positive focal length of the third lens unit L3, which is configured to move during zooming, becomes too short, and the variations in various aberrations during zooming are increased, and hence it becomes difficult to obtain the high optical characteristic over the entire zoom range.

Meanwhile, another zoom lens according to the present invention includes, in order from an object side to an image side, a first lens unit having a positive refractive power, a second lens unit having a negative refractive power, a third lens unit having a positive refractive power, and a rear lens group including at least one lens unit. Then, during zooming, the first lens unit is not configured to move, and the second lens unit, the third lens unit, and at least one lens unit included in the rear lens group are configured to move so that intervals between adjacent lens units are changed.

In each of Embodiments, the third lens unit L3, which is configured to move during zooming, has a large number of lens surfaces for correcting the various aberrations to reduce the variations in aberrations during zooming. In general, in a zoom lens having a wide angle of view, a beam that enters the first lens unit L1 has a large angle of incidence. In regard to a positive-lead zoom lens, in particular, a position in the optical axis direction of the second lens unit L2 having a relatively strong negative refractive power is important in downsizing the first lens unit L1.

Comparing at the same focal length, when the second lens unit L2 is positioned on the object side in the optical axis direction from the wide angle end to the intermediate zoom position, the first lens unit becomes easy to downsize. In order for the second lens unit L2 to be positioned on the object side in the optical axis direction from the wide angle side to the intermediate zoom position, the third lens unit L3 having the positive refractive power is required to be moved toward the object side during zooming from the wide angle side to the intermediate zoom position. The third lens unit L3 is increased in lateral magnification by being moved toward the object side, and the zoom ratio held by the second lens unit L2 may be reduced. As a result, the second lens unit L2 may be positioned on the object side.

In other words, the first lens unit L1, which is the largest in size in the positive-lead zoom lens, is not increased in size even when the wide angle is to be realized, and it becomes easy to obtain a zoom lens having the high zoom ratio while downsizing the entire system. In particular, the third lens unit L3 is moved to be positioned closest to the object side in a zoom range in which the second lens unit L2 satisfies the expression (A) provided below to obtain the effect of reducing the increase in size of the first lens unit L1. The term "first intermediate zoom position" as used herein is defined as follows.

A movement amount of the second lens unit L2 during zooming from the wide angle end to the telephoto end is represented by M2t, and a movement amount of the second lens unit L2 from the wide angle end is represented by M2m. At this time, a zoom position at which the third lens unit L3 is positioned closest to the object side in the zoom range of the movement amount M2m in which the following expression is satisfied is defined as the first intermediate zoom position.

$$0.2 \times M2t < M2m < 0.5 \times M2t \quad (A)$$

A lateral magnification of the second lens unit L2 at the wide angle end is represented by $\beta 2w$, and a lateral magnification of the second lens unit L2 at the telephoto end is represented by $\beta 2t$.

A movement amount of the third lens unit L3 during zooming from the wide angle end to the first intermediate zoom position is represented by M3m, and a total length of the zoom lens is represented by TD. The term "total length of the zoom lens" as used herein refers to a value obtained by adding the air-equivalent back focus BF to the distance from the first lens surface to the last lens surface. Moreover, the phrase "movement amount of the lens unit during zooming from the wide angle end to the telephoto end" refers to a difference between a position of the lens unit on the optical axis at the wide angle end and a position of the lens unit on the optical axis at the telephoto end.

Further, the phrase "movement amount of the lens unit during zooming from the wide angle end to the first intermediate zoom position" refers to a difference between a position of the lens unit on the optical axis at the wide angle end and a position of the lens unit on the optical axis at the first intermediate zoom position. The sign of the movement amount is positive when the lens unit is positioned closer to the object side at the telephoto end than at the wide angle end, and is negative when the lens unit is positioned closer to the image side at the telephoto end than at the wide angle end.

In the another zoom lens according to the present invention, the following conditional expressions are satisfied.

$$24.0 < \beta 2t/\beta 2w < 150.0 \quad (7)$$

$$0.035 < M3m/TD < 0.200 \quad (8)$$

Next, the technical meanings of the above-mentioned conditional expressions are described.

The conditional expression (7) defines a ratio between the lateral magnifications of the second lens unit L2 at the wide angle end and the telephoto end. When the ratio between the lateral magnifications falls below the lower limit value of the conditional expression (7), it becomes difficult to have the sufficient zoom ratio by the second lens unit L2, resulting in a difficulty realizing the high zoom ratio. On the other hand, when the ratio between the lateral magnifications exceeds the upper limit value of the conditional expression (7), the lateral magnification of the second lens unit L2 becomes too large at the telephoto end, and hence the movement of the image forming position of the second lens unit L2 becomes too large with respect to the movement of the second lens unit L2 toward the optical axis direction. In other words, the focus sensitivity of the second lens unit L2 becomes too high, and hence it becomes difficult to control the driving of the second lens unit L2 as the zoom lens.

The conditional expression (8) defines a ratio between the movement amount of the third lens unit L3 during zooming from the wide angle end to the first intermediate zoom position and the total length of the zoom lens. When the ratio falls below the lower limit value of the conditional expression (8), and hence the movement amount of the third lens unit L3 during zooming from the wide angle end to the first intermediate zoom position becomes too small, the third lens unit L3 cannot have a sufficient zoom ratio at the first intermediate zoom position. Then, the second lens unit L2 is disadvantageously extended toward the image side, which increases the size of the first lens unit L1.

When the ratio exceeds the upper limit value of the conditional expression (8), and hence the movement amount of the third lens unit L3 during zooming from the wide angle end to the first intermediate zoom position becomes too large, the total length of the zoom lens is increased in order to secure the movement amount. Then, it becomes difficult to realize the high zoom ratio while downsizing the entire system.

In each of Embodiments, the above-mentioned configuration is adopted to obtain a zoom lens that realizes the high zoom ratio and the wide angle of view while downsizing the entire system.

In each of Embodiments, it is more preferred to satisfy at least one of the conditions provided below.

$$0.001 < L1w/TD < 0.020 \tag{4}$$

$$-10.0 < f1/f2 < -5.0 \tag{5}$$

$$1.0 < f1/f3 < 4.0 \tag{6}$$

$$1.0 < (\beta 3m \times \beta Rm)/\beta 2m < 4.0 \tag{9}$$

Here, a lateral magnification of the second lens unit L2 at the first intermediate zoom position is represented by β2m, and a lateral magnification of the third lens unit L3 at the first intermediate zoom position is represented by β3m. Of the at least one lens unit that is included in the rear lens group and is configured to move during zooming, a lateral magnification of a lens unit arranged closest to the object side at the first intermediate zoom position is represented by βRm.

When the ratio falls below the lower limit value of the conditional expression (9), a product of the lateral magnifications of the third lens unit L3 and the lens unit arranged closest to the object side of the at least one lens unit that is configured to move during zooming of the rear lens group LR becomes too small. Then, when a certain focal length is to be obtained at the first intermediate zoom position, the zoom ratio held by the second lens unit L2 becomes relatively large, and hence the movement amount of the second lens unit L2 during zooming becomes too large. Then, it becomes difficult to downsize the first lens unit L1.

When the ratio exceeds the upper limit value of the conditional expression (9), the zoom ratio of the third lens unit L3 becomes too large, and the movement amount of the third lens unit L3 during zooming needs to be large. Then, it becomes difficult to realize the high zoom ratio while downsizing the entire system.

Note that, it is further preferred to set the numerical value ranges of the conditional expressions (1) to (9) as follows.

$$24.0 < \beta 2t/\beta 2w < 120.0 \tag{1a}$$

$$0.02 < M3t/TD < 0.15 \tag{2a}$$

$$0.30 < \beta 3t/\beta 3w < 1.70 \tag{3a}$$

$$0.002 < L1w/TD < 0.015 \tag{4a}$$

$$-9.5 < f1/f2 < -5.5 \tag{5a}$$

$$1.2 < f1/f3 < 3.0 \tag{6a}$$

$$24.0 < \beta 2t/\beta 2w < 120.0 \tag{7a}$$

$$0.035 < M3m/TD < 0.150 \tag{8a}$$

$$1.2 < (\beta 3m \times \beta Rm)/\beta 2m < 3.5 \tag{9a}$$

It is even further preferred to set the numerical value ranges of the conditional expressions (1a) to (9a) as follows.

$$24.5 < \beta 2t/\beta 2w < 100.0 \tag{1b}$$

$$0.03 < M3t/TD < 0.10 \tag{2b}$$

$$0.30 < \beta 3t/\beta 3w < 1.50 \tag{3b}$$

$$0.003 < L1w/TD < 0.010 \tag{4b}$$

$$-9.0 < f1/f2 < -6.0 \tag{5b}$$

$$1.30 < f1/f3 < 2.60 \tag{6b}$$

$$24.5 < \beta 2t/\beta 2w < 100.0 \tag{7b}$$

$$0.0355 < M3m/TD < 0.1000 \tag{8b}$$

$$1.7 < (\beta 3m \times \beta Rm)/\beta 2m < 3.0 \tag{9b}$$

Next, features of lens configurations of the zoom lens according to Embodiments 1 to 6 of the present invention are described. In the following description, the lens configurations of the lens units are arranged in order from the object side to the image side unless otherwise noted.

Embodiment 1

The zoom lens of Embodiment 1 includes, in order from the object side to the image side, a first lens unit L1 having a positive refractive power, a second lens unit L2 having a negative refractive power, a third lens unit L3 having a positive refractive power, and a rear lens group LR. The rear lens group LR consists of a fourth lens unit L4 having a positive refractive power. During zooming from the wide angle end to the telephoto end, the second lens unit L2 is configured to move toward the image side to mainly vary the magnification, and the third lens unit L3 is configured to move along a locus that is convex toward the object side to vary the magnification.

The fourth lens unit L4 is configured to move along a locus that is convex toward the object side to mainly correct an image plane variation accompanying the varying magnification. The fourth lens unit L4 is configured to move along the locus that is convex toward the object side to effectively utilize an interval between the third lens unit L3 and the fourth lens unit L4, and an interval between the fourth lens unit L4 and the glass block GB.

Also in each of Embodiments that follow, a similar zoom locus is followed to effectively utilize the intervals before and after the fourth lens unit L4.

Focusing from infinity to short distance is performed by moving the fourth lens unit L4 toward the object side. The first lens unit L1 includes a cemented lens formed by cementing a negative lens and a positive lens, and two positive lenses. The second lens unit L2 includes two negative lenses, and a cemented lens formed by cementing a positive lens and a negative lens. A lens configuration is adopted in which the second lens unit, which mainly varies the magnification, includes a larger number of lenses than those of the other movable lens units, to thereby satisfactorily correct the variations in aberrations during zooming. In particular, a variation in field curvature and a variation in chromatic aberration are satisfactorily corrected.

The third lens unit L3 includes two positive lenses and a negative lens. A lens closest to the object side has aspherical shapes on both lens surfaces to satisfactorily correct the spherical aberration. The fourth lens unit L4 includes a cemented lens formed by cementing a positive lens and a negative lens. Then, a lens surface on the object side of the positive lens has an aspherical shape to satisfactorily correct the spherical aberration and the variation in field curvature due to zooming. Moreover, the cemented lens is used to satisfactorily correct variations in axial chromatic aberration and lateral chromatic aberration due to zooming.

The aperture stop SP is arranged on the object side of the third lens unit, and is configured to move along with the third lens unit (along the same locus as that of the third lens unit L3) during zooming. Note that, the cemented lens in this Embodiment may be replaced by a separated lens having a minute air interval. This is encompassed by variations and modifications as a lens shape to the present invention, and the same applies to all Embodiments that follow.

Embodiment 2

In Embodiment 2, the number of lens units, signs of the refractive powers of the lens units, movement conditions of the lens units during zooming, and the like are the same as in Embodiment 1. A focusing system is the same as in Embodiment 1.

A lens configuration of the first lens unit L1 is similar to that of Embodiment 1. A lens configuration of the second lens unit L2 is similar to that of Embodiment 1. The third lens unit L3 includes a positive lens, a negative lens, and a positive lens. One lens surface of each of a lens closest to the object side and a lens closest to the image side has an aspherical shape to satisfactorily correct the spherical aberration. A lens configuration of the fourth lens unit L4 is similar to that of Embodiment 1. The aperture stop SP is arranged on the object side of the third lens unit L3, and is not configured to move during zooming.

Embodiment 3

In Embodiment 3, the number of lens units, signs of the refractive powers of the lens units, movement conditions of the lens units during zooming, and the like are the same as in Embodiment 1. A focusing system is the same as in Embodiment 1.

A lens configuration of the first lens unit L1 is similar to that of Embodiment 1. A lens configuration of the second lens unit L2 is similar to that of Embodiment 1. The third lens unit L3 includes two positive lenses, a negative lens, and a positive lens. A lens closest to the object side has aspherical shapes on both lens surfaces to satisfactorily correct the spherical aberration. A lens configuration of the fourth lens unit L4 is similar to that of Embodiment 1. The aperture stop SP is arranged on the object side of the third lens unit L3, and is configured to move along with the third lens unit L3 during zooming.

Embodiment 4

The zoom lens of Embodiment 4 includes, in order from the object side to the image side, a first lens unit L1 having a positive refractive power, a second lens unit L2 having a negative refractive power, a third lens unit L3 having a positive refractive power, and a rear lens group LR. The rear lens group LR consists of a fourth lens unit L4 having a positive refractive power and a fifth lens unit L5 having a negative refractive power. During zooming from the wide angle end to the telephoto end, the second lens unit L2 is configured to move monotonously toward the image side to mainly vary the magnification, and the third lens unit L3 is configured to move along a locus that is convex toward the object side to vary the magnification. The fourth lens unit L4 is configured to move along a locus that is convex toward the object side to mainly correct an image plane variation accompanying the varying magnification. The fifth lens unit L5 is not configured to move during zooming.

A focusing system is the same as in Embodiment 1. A lens configuration of the first lens unit L1 is similar to that of Embodiment 1. A lens configuration of the second lens unit L2 is similar to that of Embodiment 1. The third lens unit L3 includes a positive lens and a negative lens. A lens closest to the object side has aspherical shapes on both lens surfaces to satisfactorily correct the spherical aberration. A lens configuration of the fourth lens unit L4 is similar to that of Embodiment 1. The fifth lens unit L5 includes one negative lens. The aperture stop SP is arranged on the image side of the third lens unit L3, and is configured to move along with the third lens unit L3 during zooming.

Embodiment 5

In Embodiment 5, the number of lens units, signs of the refractive powers of the lens units, movement conditions of the lens units during zooming, and the like are the same as in Embodiment 1. A focusing system is the same as in Embodiment 1.

The first lens unit L1 includes a cemented lens formed by cementing a negative lens and a positive lens, and three positive lenses. A lens configuration of the second lens unit L2 is similar to that of Embodiment 1. The third lens unit L3 includes a positive lens and a negative lens. A lens closest to the object side has aspherical shapes on both lens surfaces to satisfactorily correct the spherical aberration. A lens configuration of the fourth lens unit L4 is similar to that of Embodiment 1. The aperture stop SP is arranged in the third lens unit L3, and is configured to move along with the third lens unit L3 during zooming.

Embodiment 6

In Embodiment 6, the number of lens units, signs of the refractive powers of the lens units, movement conditions of the lens units during zooming, and the like are the same as in Embodiment 1. A focusing system is the same as in Embodiment 1.

A lens configuration of the first lens unit L1 is similar to that of Embodiment 1. A lens configuration of the second lens unit L2 is similar to that of Embodiment 1. The third lens unit L3 includes two positive lenses and a negative lens. A lens closest to the object side has aspherical shapes on both lens surfaces to satisfactorily correct the spherical aberration. A lens configuration of the fourth lens unit L4 is similar to that of Embodiment 1. The aperture stop SP is arranged on the object side of the third lens unit L3, and is configured to move along with the third lens unit L3 during zooming.

As described above, according to each of Embodiments, there may be obtained a zoom lens suitable for an image pickup apparatus such as a digital camera, a video camera, or a monitoring camera, which is small in size as the entire system, has the high zoom ratio, and further is reduced in focus sensitivity at the telephoto end.

Next, an example of the image pickup apparatus, which is the digital video camera using the zoom lens according to the present invention as an image pickup optical system, is described with reference to FIG. 13. In FIG. 13, a camera main body 10, and an image pickup optical system 11 formed of the zoom lens according to any one of Embodiments 1 to 6 are illustrated. A solid-state image pickup element (photoelectric converting element) 12 such as a CCD sensor or a CMOS sensor is included in the camera main body and is configured to receive light of a subject image formed by the image pickup optical system 11. A display unit 13 is configured to display the subject image obtained by the solid-state image pickup element 12.

Next, an example of the image pickup apparatus, which is the monitoring camera using the zoom lens according to the present invention as an image pickup optical system, is described with reference to FIG. 14. In FIG. 14, a camera main body 20, and an image pickup optical system 21 formed of the zoom lens according to any one of Embodiments 1 to 6 are illustrated. A solid-state image pickup element (photoelectric converting element) 22 such as a CCD sensor or a CMOS sensor is included in the camera main body and is configured to receive light of a subject image formed by the image pickup optical system 21. As described above, the zoom lens according to the present invention is applied to the image pickup apparatus such as the digital video camera or the monitoring camera to realize an image pickup apparatus which is small in size and has the high optical characteristic.

Note that, the zoom lens according to each of Embodiments may be used as a projection optical system for a projection device (projector).

The exemplary embodiments of the present invention are described above, but the present invention is not limited to these embodiments and can be modified and changed variously within the scope of the gist thereof.

Next, Numerical Embodiments 1 to 6 are described, which correspond to Embodiments 1 to 6 of the present invention, respectively. In each of Numerical Embodiments, symbol i represents the order of a surface from the object side. Symbol ri represents a radius of curvature of an i-th surface in order from the object side, symbol di represents an interval between an i-th surface and an (i+1)th surface in order from the object side, and symbols ndi and vdi represent a refractive index and an Abbe constant of a material of an optical member between the i-th surface and the (i+1)th surface, respectively. Various data show numerical values at the wide angle end (wide angle), the second intermediate zoom position, the telephoto end (telephoto), and the first intermediate zoom position (intermediate zoom position) determined by using the expression A.

The focal length, the f-number, and the half angle of field represent values when focus is on an object at infinity. Back focus BF is an air-equivalent value of a distance from the last lens surface to the image plane. Note that, when a coordinate in the optical axis direction is represented by x, a coordinate in a direction perpendicular to the optical axis is represented by y, a radius of curvature of the standard (reference spherical surface) is represented by r, a conic constant is represented by k, and an n-th order aspherical coefficient is represented by An, the aspherical shape is expressed by the following expression. However, "e-x" means "×10$^{-x}$". Note that, the lens surfaces having the aspherical shapes are marked with asterisks (*) on the right side of surface numbers in the tables.

$$x=(y^2/r)/\{1+(1-k \cdot y^2/r^2)^{0.5}\}+A4 \cdot y^4+A6 \cdot y^6+A8 \cdot y^8$$

Moreover, the locus of the third lens unit in each of Embodiments is expressed by the expression (B) provided below, and the lens arrangement at the first intermediate zoom position described above is written as the first intermediate zoom position in Numerical Embodiments 1 to 6.

Note that, m2 in the expression (B) is a value obtained by standardizing the movement amount of the second lens unit L2 from the wide angle end with the movement amount during zooming from the wide angle end to the telephoto end, which is 0 at the wide angle end and is 1 at the telephoto end. The movement amount of the third lens unit L3 from the wide angle end is represented by m3. A movement amount coefficient of n-th order is represented by Bn.

$$m3=B1 \cdot m2+B2 \cdot m2^2+B3 \cdot m2^3+B4 \cdot m2^4+B5 \cdot m2^5+B6 \cdot m2^6 \quad (B)$$

The correspondence between each of Embodiments and each of the above-mentioned conditional expressions is shown in Table 1.

Numerical Embodiment 1

| Unit mm | | | | |
|---|---|---|---|---|
| Surface data | | | | |
| Surface number | r | d | nd | vd |
| 1 | 63.482 | 1.25 | 1.85478 | 24.8 |
| 2 | 38.084 | 4.58 | 1.49700 | 81.5 |
| 3 | 273.739 | 0.15 | | |
| 4 | 40.530 | 3.41 | 1.59522 | 67.7 |
| 5 | 164.674 | 0.10 | | |
| 6 | 34.366 | 2.49 | 1.59522 | 67.7 |
| 7 | 72.388 | (Variable) | | |
| 8 | 85.399 | 0.45 | 2.00100 | 29.1 |
| 9 | 7.562 | 4.01 | | |
| 10 | −30.399 | 0.40 | 1.91082 | 35.3 |
| 11 | 24.397 | 0.12 | | |
| 12 | 14.948 | 3.33 | 1.95906 | 17.5 |
| 13 | −20.844 | 0.40 | 2.00100 | 29.1 |
| 14 | 96.240 | (Variable) | | |
| 15 (Stop) | ∞ | 0.34 | | |
| 16* | 12.978 | 2.83 | 1.58313 | 59.4 |
| 17* | 168.207 | 0.50 | | |
| 18 | 17.489 | 1.55 | 1.72916 | 54.7 |
| 19 | 60.020 | 1.74 | | |
| 20 | 20.062 | 0.55 | 1.85478 | 24.8 |
| 21 | 9.095 | (Variable) | | |
| 22* | 15.613 | 2.80 | 1.55332 | 71.7 |

-continued

Unit mm

| | | | | |
|---|---|---|---|---|
| 23 | −13.944 | 0.50 | 1.85478 | 24.8 |
| 24 | −21.413 | (Variable) | | |
| 25 | ∞ | 1.44 | 1.51500 | 70.0 |
| 26 | ∞ | 3.80 | | |
| Image plane | ∞ | | | |

Aspherical surface data

Sixteenth surface

K = −2.67885e−001 A4 = −2.56132e−005 A6 = −5.61175e−008
A8 = −7.34706e−010
Seventeenth surface K = −2.00000e+000 A4 = 2.76080e−005 A6= −8.85679e−008
Twenty-second surface K = −2.03476e+000 A4 = 2.60795e−005 A6 = −8.48223e−008

Various data
Zoom ratio 38.00

| | Wide angle | Second intermediate zoom position | Telephoto | First intermediate zoom position |
|---|---|---|---|---|
| Focal length | 4.00 | 41.23 | 152.00 | 10.44 |
| F-number | 1.60 | 2.80 | 4.90 | 2.20 |
| Half angle of field (degree) | 36.87 | 4.16 | 1.13 | 16.03 |
| Image height | 3.00 | 3.00 | 3.00 | 3.00 |
| Total lens length | 99.50 | 94.50 | 94.50 | 94.50 |
| BF | 12.36 | 22.30 | 6.95 | 17.20 |
| d7 | 0.58 | 25.47 | 31.69 | 13.02 |
| d14 | 39.42 | 7.44 | 1.80 | 20.30 |
| d21 | 10.64 | 7.79 | 22.56 | 12.47 |
| d24 | 7.61 | 17.55 | 2.20 | 12.45 |

Zoom lens unit data

| Unit | First surface | Focal length |
|---|---|---|
| 1 | 1 | 44.90 |
| 2 | 8 | −6.93 |
| 3 | 15 | 28.09 |
| 4 | 22 | 19.08 |

Zoom locus data

| | | |
|---|---|---|
| B1 = −42.809 | B2 = 87.283 | B3 = −46.821 |
| B4 = −20.817 | B5 = −8.771 | B6 = 25.422 |

Numerical Embodiment 2

Unit mm

Surface data

| Surface number | r | d | nd | vd |
|---|---|---|---|---|
| 1 | 60.176 | 1.25 | 1.85478 | 24.8 |
| 2 | 36.685 | 6.31 | 1.49700 | 81.5 |
| 3 | 5,194.038 | 0.15 | | |
| 4 | 34.537 | 4.16 | 1.49700 | 81.5 |
| 5 | 145.241 | 0.10 | | |
| 6 | 27.522 | 3.67 | 1.59522 | 67.7 |
| 7 | 58.129 | (Variable) | | |
| 8 | 56.214 | 0.45 | 2.04976 | 27.1 |
| 9 | 6.182 | 3.19 | | |
| 10 | −23.467 | 0.40 | 2.00100 | 29.1 |
| 11 | 38.775 | 0.12 | | |
| 12 | 13.144 | 3.45 | 1.95906 | 17.5 |
| 13 | −10.636 | 0.40 | 2.00100 | 29.1 |
| 14 | 51.426 | (Variable) | | |
| 15 (Stop) | ∞ | (Variable) | | |
| 16* | 12.067 | 3.60 | 1.69350 | 53.2 |
| 17 | −206.102 | 4.14 | | |
| 18 | 36.248 | 0.60 | 2.00100 | 29.1 |
| 19 | 9.129 | 0.77 | | |
| 20* | 10.270 | 2.48 | 1.49710 | 81.6 |
| 21 | 141.614 | (Variable) | | |
| 22* | 14.775 | 2.96 | 1.49710 | 81.6 |
| 23 | −19.624 | 0.50 | 1.94595 | 18.0 |
| 24 | −22.712 | (Variable) | | |
| 25 | ∞ | 1.44 | 1.51500 | 70.0 |
| 26 | ∞ | 3.80 | | |
| Image plane | ∞ | | | |

Aspherical surface data

Sixteenth surface

K = −1.94831e+000 A4 = 9.03636e−005 A6 = −1.63379e−007
Twentieth surface

K = 4.20170e−001 A4 = −1.15300e−004 A6 = −7.75317e−007
Twenty-second surface

K = −1.44647e+000 A4 = −6.01637e−007 A6 = −2.42151e−007

Various data
Zoom ratio 40.00

| | Wide angle | Second intermediate zoom position | Telephoto | First intermediate zoom position |
|---|---|---|---|---|
| Focal length | 4.20 | 36.48 | 168.00 | 11.16 |
| F-number | 1.80 | 3.00 | 5.20 | 2.40 |
| Half angle of field (degree) | 35.54 | 4.70 | 1.02 | 15.04 |
| Image height | 3.00 | 3.00 | 3.00 | 3.00 |
| Total lens length | 94.53 | 94.53 | 94.53 | 94.53 |
| BF | 12.87 | 21.87 | 6.80 | 18.11 |
| d7 | 0.61 | 19.85 | 24.66 | 11.43 |
| d14 | 25.84 | 6.61 | 1.80 | 15.02 |
| d15 | 8.14 | 3.85 | 1.00 | 4.05 |
| d21 | 8.36 | 3.65 | 21.58 | 7.21 |
| d24 | 8.12 | 17.12 | 2.05 | 13.36 |

Zoom lens unit data

| Unit | First surface | Focal length |
|---|---|---|
| 1 | 1 | 37.66 |
| 2 | 8 | −5.49 |
| 3 | 16 | 25.99 |
| 4 | 22 | 19.59 |

Zoom locus data

| | | |
|---|---|---|
| B1 = −26.046 | B2 = 56.876 | B3 = −44.254 |
| B4 = −8.731 | B5 = 37.324 | B6 = −22.312 |

Numerical Embodiment 3

Unit mm

Surface data

| Surface number | r | d | nd | vd |
|---|---|---|---|---|
| 1 | 70.615 | 1.25 | 1.85478 | 24.8 |
| 2 | 43.505 | 6.69 | 1.49700 | 81.5 |
| 3 | 350.006 | 0.15 | | |
| 4 | 47.844 | 3.39 | 1.59522 | 67.7 |
| 5 | 126.104 | 0.10 | | |
| 6 | 40.721 | 3.08 | 1.59522 | 67.7 |
| 7 | 95.108 | (Variable) | | |
| 8 | 45.836 | 0.45 | 2.00100 | 29.1 |
| 9 | 7.200 | 4.97 | | |
| 10 | −32.239 | 0.40 | 1.91082 | 35.3 |
| 11 | 24.280 | 0.12 | | |
| 12 | 14.516 | 3.66 | 1.95906 | 17.5 |
| 13 | −21.812 | 0.40 | 2.00100 | 29.1 |
| 14 | 60.799 | (Variable) | | |
| 15 (Stop) | ∞ | 0.34 | | |
| 16* | 12.896 | 3.50 | 1.58313 | 59.4 |
| 17* | 62.566 | 0.10 | | |
| 18 | 19.668 | 1.68 | 1.72916 | 54.7 |
| 19 | 46.477 | 1.00 | | |
| 20 | 17.142 | 0.55 | 1.84666 | 23.8 |
| 21 | 9.450 | 2.84 | | |
| 22 | 20.277 | 2.00 | 1.48749 | 70.2 |
| 23 | 195.097 | (Variable) | | |
| 24* | 18.649 | 2.20 | 1.55332 | 71.7 |
| 25 | −23.644 | 0.50 | 1.85478 | 24.8 |
| 26 | −53.634 | (Variable) | | |
| 27 | ∞ | 1.44 | 1.51500 | 70.0 |
| 28 | ∞ | 3.80 | | |
| Image plane | ∞ | | | |

Aspherical surface data

Sixteenth surface $K = -2.67885e-001$ $A4 = 3.13810e-006$ $A6 = -1.61502e-007$
$A8 = -1.78081e-009$ Seventeenth surface $K = -1.97044e+000$ $A4 = 4.37150e-005$ $A6 = -3.95984e-007$ Twenty-fourth surface $K = -2.24477e+000$ $A4 = 3.33214e-005$ $A6 = -4.39373e-008$

Various data
Zoom ratio 49.99

| | Wide angle | Second intermediate zoom position | Telephoto | First intermediate zoom position |
|---|---|---|---|---|
| Focal length | 3.60 | 40.18 | 180.00 | 9.28 |
| F-number | 1.80 | 3.50 | 5.60 | 2.50 |
| Half angle of field (degree) | 39.80 | 4.27 | 0.95 | 17.92 |
| Image height | 3.00 | 3.00 | 3.00 | 3.00 |
| Total lens length | 109.63 | 109.63 | 109.63 | 109.63 |
| BF | 8.78 | 23.22 | 6.78 | 13.01 |
| d7 | 0.60 | 31.79 | 39.59 | 14.25 |
| d14 | 48.76 | 10.04 | 1.77 | 27.13 |
| d23 | 12.13 | 5.22 | 22.13 | 15.89 |
| d26 | 4.03 | 18.47 | 2.03 | 8.26 |

Zoom lens unit data

| Unit | First surface | Focal length |
|---|---|---|
| 1 | 1 | 54.38 |
| 2 | 8 | −6.77 |
| 3 | 15 | 23.25 |
| 4 | 24 | 30.63 |

Zoom locus data

| | | |
|---|---|---|
| B1 = −52.045 | B2 = 103.027 | B3 = −45.679 |
| B4 = −26.896 | B5 = −15.052 | B6 = 28.646 |

Numerical Embodiment 4

Unit mm

Surface data

| Surface number | r | d | nd | vd |
|---|---|---|---|---|
| 1 | 63.280 | 1.25 | 1.85478 | 24.8 |
| 2 | 38.238 | 4.96 | 1.49700 | 81.5 |
| 3 | 281.483 | 0.15 | | |
| 4 | 40.684 | 3.66 | 1.59522 | 67.7 |
| 5 | 162.362 | 0.10 | | |
| 6 | 34.310 | 2.65 | 1.59522 | 67.7 |
| 7 | 71.759 | (Variable) | | |
| 8 | 91.520 | 0.45 | 2.00100 | 29.1 |
| 9 | 7.681 | 3.94 | | |
| 10 | −35.331 | 0.40 | 2.00100 | 29.1 |
| 11 | 24.848 | 0.12 | | |
| 12 | 15.267 | 3.65 | 1.95906 | 17.5 |
| 13 | −14.528 | 0.40 | 2.00100 | 29.1 |
| 14 | 85.889 | (Variable) | | |
| 15* | 11.636 | 3.49 | 1.58313 | 59.4 |
| 16* | −62.849 | 0.10 | | |
| 17 | 16.494 | 0.55 | 1.85478 | 24.8 |
| 18 | 10.756 | 2.84 | | |
| 19 (Stop) | ∞ | (Variable) | | |
| 20* | 15.578 | 3.07 | 1.55332 | 71.7 |
| 21 | −10.721 | 0.50 | 1.85478 | 24.8 |
| 22 | −17.684 | (Variable) | | |
| 23 | 60.499 | 0.50 | 1.77250 | 49.6 |
| 24 | 16.528 | 0.50 | | |
| 25 | ∞ | 1.44 | 1.51500 | 70.0 |
| 26 | ∞ | 1.00 | | |
| Image plane | ∞ | | | |

Aspherical surface data

Fifteenth surface $K = -2.67885e-001$ $A4 = -3.58308e-005$ $A6 = -7.82696e-008$
$A8 = -9.17088e-010$ Sixteenth surface $K = -1.98824e+000$ $A4 = 4.28658e-005$ $A6 = -1.29362e-007$ Twentieth surface $K = -3.20117e+000$ $A4 = 5.14241e-005$ $A6 = -3.01652e-007$

Various data
Zoom ratio 40.00

| | Wide angle | Second intermediate zoom position | Telephoto | First intermediate zoom position |
|---|---|---|---|---|
| Focal length | 4.00 | 39.11 | 160.00 | 10.42 |
| F-number | 1.60 | 2.80 | 5.00 | 2.40 |
| Half angle of field (degree) | 36.87 | 4.39 | 1.07 | 16.06 |
| Image height | 3.00 | 3.00 | 3.00 | 3.00 |
| Total lens length | 94.51 | 94.51 | 94.51 | 94.51 |
| BF | 2.45 | 2.45 | 2.45 | 2.45 |

-continued

Unit mm

| | | | | |
|---|---|---|---|---|
| d7 | 0.56 | 25.48 | 31.71 | 13.02 |
| d14 | 36.86 | 5.57 | 1.79 | 17.46 |
| d19 | 12.85 | 10.61 | 22.48 | 15.23 |
| d22 | 9.01 | 17.63 | 3.31 | 13.57 |

Zoom lens unit data

| Unit | First surface | Focal length |
|---|---|---|
| 1 | 1 | 44.95 |
| 2 | 8 | −6.62 |
| 3 | 15 | 27.48 |
| 4 | 20 | 18.45 |
| 5 | 23 | −29.58 |

Zoom locus data

| | | |
|---|---|---|
| B1 = −43.918 | B2 = 87.752 | B3 = −45.813 |
| B4 = −19.759 | B5 = −8.017 | B6 = 25.828 |

Numerical Embodiment 5

Unit mm

Surface data

| Surface number | r | d | nd | vd |
|---|---|---|---|---|
| 1 | 73.639 | 1.25 | 2.00069 | 25.5 |
| 2 | 52.722 | 6.37 | 1.43875 | 94.9 |
| 3 | 235.373 | 0.15 | | |
| 4 | 81.729 | 2.90 | 1.49700 | 81.5 |
| 5 | 169.291 | 0.10 | | |
| 6 | 49.225 | 3.88 | 1.49700 | 81.5 |
| 7 | 112.026 | 0.10 | | |
| 8 | 52.778 | 2.98 | 1.59522 | 67.7 |
| 9 | 98.951 | (Variable) | | |
| 10 | 51.734 | 0.45 | 2.04976 | 27.1 |
| 11 | 9.400 | 5.53 | | |
| 12 | −45.393 | 0.40 | 1.91082 | 35.3 |
| 13 | 21.681 | 0.12 | | |
| 14 | 18.338 | 4.56 | 1.95906 | 17.5 |
| 15 | −15.743 | 0.40 | 2.00100 | 29.1 |
| 16 | 88.030 | (Variable) | | |
| 17* | 18.360 | 2.31 | 1.58313 | 59.4 |
| 18* | −32.280 | 0.70 | | |
| 19 (Stop) | ∞ | 3.40 | | |
| 20 | 229.121 | 0.55 | 1.85478 | 24.8 |
| 21 | 26.082 | (Variable) | | |
| 22* | 28.278 | 1.89 | 1.55332 | 71.7 |
| 23 | −13.787 | 0.50 | 1.85478 | 24.8 |
| 24 | −20.216 | (Variable) | | |
| 25 | ∞ | 1.44 | 1.51500 | 70.0 |
| 26 | ∞ | 3.80 | | |
| Image plane | ∞ | | | |

Aspherical surface data

Seventeenth surface

K = −2.67885e−001 A4 = 1.89521e−005 A6 = −2.11711e−006
A8 = −2.06948e−008
Eighteenth surface K = 3.11262e+000 A4 = 9.08108e−005 A6 = −3.24308e−006
Twenty-second surface K = 3.39379e+000 A4 = −3.28828e−005 A6 = −7.93695e−007

-continued

Unit mm

Various data
Zoom ratio 81.05

| | Wide angle | Second intermediate zoom position | Telephoto | First intermediate zoom position |
|---|---|---|---|---|
| Focal length | 3.70 | 48.35 | 300.00 | 11.23 |
| F-number | 2.40 | 5.00 | 8.00 | 3.00 |
| Half angle of field (degree) | 39.02 | 3.55 | 0.57 | 14.96 |
| Image height | 3.00 | 3.00 | 3.00 | 3.00 |
| Total lens length | 128.67 | 128.67 | 128.67 | 128.67 |
| BF | 16.35 | 30.38 | 6.76 | 23.35 |
| d9 | 0.59 | 39.51 | 49.24 | 20.05 |
| d16 | 59.84 | 13.21 | 0.98 | 28.31 |
| d21 | 13.36 | 7.04 | 33.16 | 18.43 |
| d24 | 11.60 | 25.63 | 2.01 | 18.60 |

Zoom lens unit data

| Unit | First surface | Focal length |
|---|---|---|
| 1 | 1 | 66.52 |
| 2 | 10 | −7.73 |
| 3 | 17 | 36.19 |
| 4 | 22 | 25.30 |

Zoom locus data

| | | |
|---|---|---|
| B1 = −61.837 | B2 = 89.251 | B3 = −27.473 |
| B4 = 6.7 | B5 = 5.666 | B6 = −22.523 |

Numerical Embodiment 6

Unit mm

Surface data

| Surface number | r | d | nd | vd |
|---|---|---|---|---|
| 1 | 63.257 | 1.25 | 1.85478 | 24.8 |
| 2 | 37.826 | 5.95 | 1.49700 | 81.5 |
| 3 | 294.500 | 0.15 | | |
| 4 | 40.078 | 4.24 | 1.59522 | 67.7 |
| 5 | 159.339 | 0.10 | | |
| 6 | 33.266 | 3.11 | 1.59522 | 67.7 |
| 7 | 72.907 | (Variable) | | |
| 8 | 117.835 | 0.45 | 2.00100 | 29.1 |
| 9 | 6.904 | 3.58 | | |
| 10 | −25.819 | 0.40 | 1.91082 | 35.3 |
| 11 | 27.286 | 0.12 | | |
| 12 | 14.106 | 3.01 | 1.95906 | 17.5 |
| 13 | −18.607 | 0.40 | 2.00100 | 29.1 |
| 14 | 68.948 | (Variable) | | |
| 15 (Stop) | ∞ | 0.34 | | |
| 16* | 14.327 | 3.52 | 1.58313 | 59.4 |
| 17* | −35.030 | 0.06 | | |
| 18 | 9.311 | 2.96 | 1.72916 | 54.7 |
| 19 | 90.528 | 0.89 | | |
| 20 | 57.178 | 0.55 | 1.85478 | 24.8 |
| 21 | 6.372 | (Variable) | | |
| 22* | 11.103 | 2.15 | 1.55332 | 71.7 |
| 23 | −29.385 | 0.50 | 1.85478 | 24.8 |
| 24 | −46.711 | (Variable) | | |
| 25 | ∞ | 1.44 | 1.51500 | 70.0 |
| 26 | ∞ | 1.00 | | |
| Image plane | ∞ | | | |

-continued

Unit mm

Aspherical surface data

Sixteenth surface

K = −2.67885e−001 A4 = −4.34584e−005 A6 = −3.63169e−008
A8 = −8.40707e−010
Seventeenth surface K = 1.89767e+000 A4 = 4.53309e−005 A6 = −1.54397e−008
Twenty-second surface K = −3.60972e+000 A4 = 2.53831e−004 A6 = −7.90455e−007

Various data
Zoom ratio 30.00

|  | Wide angle | Second intermediate zoom position | Telephoto | First intermediate zoom position |
|---|---|---|---|---|
| Focal length | 4.00 | 35.92 | 120.00 | 7.68 |
| F-number | 1.50 | 2.80 | 4.00 | 1.80 |
| Half angle of field (degree) | 36.87 | 4.77 | 1.43 | 21.33 |
| Image height | 3.00 | 3.00 | 3.00 | 3.00 |
| Total lens length | 84.54 | 84.54 | 84.54 | 84.54 |
| BF | 5.78 | 15.51 | 5.23 | 9.09 |
| d7 | 0.55 | 23.90 | 29.74 | 9.31 |
| d14 | 33.87 | 7.92 | 1.75 | 22.04 |
| d21 | 10.62 | 3.48 | 14.09 | 10.38 |
| d24 | 3.83 | 13.56 | 3.28 | 7.14 |

Zoom lens unit data

| Unit | First surface | Focal length |
|---|---|---|
| 1 | 1 | 43.49 |
| 2 | 8 | −6.11 |
| 3 | 15 | 17.49 |
| 4 | 22 | 17.51 |

Zoom locus data

| B1 = −26.322 | B2 = 68.55 | B3 = −46.375 |
| B4 = −11.548 | B5 = −4.241 | B6 = 17.011 |

TABLE 1

| Conditional Expression | Embodiment | | | | | |
|---|---|---|---|---|---|---|
|  | 1 | 2 | 3 | 4 | 5 | 6 |
| (1) | 40.79 | 39.21 | 31.85 | 48.57 | 82.59 | 24.87 |
| (2) | 0.069 | 0.075 | 0.073 | 0.041 | 0.079 | 0.034 |
| (3) | 0.47 | 0.48 | 1.43 | 0.41 | 0.46 | 1.15 |
| (4) | 0.0061 | 0.0064 | 0.0054 | 0.0059 | 0.0046 | 0.0065 |
| (5) | −6.48 | −6.86 | −8.03 | −6.79 | −8.61 | −7.12 |
| (6) | 1.60 | 1.45 | 2.34 | 1.64 | 1.84 | 2.49 |
| (7) | 40.79 | 39.21 | 31.85 | 48.57 | 82.59 | 24.87 |
| (8) | 0.070 | 0.043 | 0.072 | 0.073 | 0.093 | 0.036 |
| (9) | 1.83 | 1.90 | 2.63 | 1.83 | 2.51 | 2.22 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-240828, filed Nov. 28, 2014, and Japanese Patent Application No. 2014-240829, filed Nov. 28, 2014 which are hereby incorporated by reference herein in their entirety.

What is claimed is:

1. A zoom lens, comprising, in order from an object side to an image side:
   a first lens unit having a positive refractive power;
   a second lens unit having a negative refractive power;
   a third lens unit having a positive refractive power; and
   a rear lens group including at least one lens unit,
   wherein during zooming, the first lens unit does not move, and the second lens unit, the third lens unit, and at least one lens unit included in the rear lens group move so that intervals between adjacent lens units are changed during zooming, and
   wherein the following conditional expressions are satisfied:

$20.0 < \beta 2t/\beta 2w < 150.0;$ $0.01 < M3t/TD \leq 0.075;$ and $0.47 \leq \beta 3t/\beta 3w < 2.00,$ where $\beta 2w$ represents a lateral magnification of the second lens unit at a wide angle end, $\beta 2t$ represents a lateral magnification of the second lens unit at a telephoto end, M3t represents a movement amount of the third lens unit during zooming from the wide angle end to the telephoto end, TD represents a total length of the zoom lens, $\beta 3w$ represents a lateral magnification of the third lens unit at the wide angle end, and $\beta 3t$ represents a lateral magnification of the third lens unit at the telephoto end.

2. A zoom lens according to claim 1, wherein the third lens unit includes a negative lens and at least two positive lenses.

3. A zoom lens according to claim 1, wherein the following conditional expression is satisfied:

$0.001 < L1w/TD < 0.020,$ where L1w represents an interval on an optical axis between the first lens unit and the second lens unit at the wide angle end.

4. A zoom lens according to claim 1, wherein the following conditional expression is satisfied:

$-10.0 < f1/f2 < -5.0,$ where f1 represents a focal length of the first lens unit, and f2 represents a focal length of the second lens unit.

5. A zoom lens according to claim 1, wherein the following conditional expression is satisfied:

$1.0 < f1/f3 < 4.0,$ where f1 represents a focal length of the first lens unit, and f3 represents a focal length of the third lens unit.

6. A zoom lens according to claim 1, wherein during zooming from the wide angle end to the telephoto end, the second lens unit moves monotonously toward the image side, and the third lens unit moves toward the object side and then move toward the image side.

7. A zoom lens according to claim 1, wherein the rear lens group consists of a fourth lens unit having a positive refractive power.

8. A zoom lens according to claim 1, wherein the rear lens group consists of, in order from the object side to the image side, a fourth lens unit having a positive refractive power, and a fifth lens unit having a negative refractive power, and
   wherein the fourth lens unit moves during zooming, and the fifth lens unit does not move for zooming.

9. The zoom lens according to claim 1, wherein a zoom position at which the third lens unit is positioned closest to the object side in a zoom range that satisfies the following conditional expression is defined as an intermediate zoom position:

$$0.2 \times M2t < M2m < 0.5 \times M2t,$$

where M2t represents a movement amount of the second lens unit during zooming from the wide angle end to the telephoto end, and M2m represents a movement amount of the second lens unit from the wide angle end, and
wherein the following conditional expression is satisfied:

$$0.035 < M3m/TD < 0.200,$$

where M3m represents a movement amount of the third lens unit during zooming from the wide angle end to the intermediate zoom position.

10. A zoom lens according to claim 9, wherein the following conditional expression is satisfied:

$$1.0 < (\beta 3m \times \beta Rm)/\beta 2m < 4.0,$$

where β2m represents a lateral magnification of the second lens unit at the intermediate zoom position, β3m represents a lateral magnification of the third lens unit at the intermediate zoom position, and βRm represents, of the at least one lens unit that is included in the rear lens group and moves during zooming, a lateral magnification of a lens unit arranged closest to the object side at the intermediate zoom position.

11. An image pickup apparatus, comprising:
a zoom lens comprising, in order from an object side to an image side:
  a first lens unit having a positive refractive power;
  a second lens unit having a negative refractive power;
  a third lens unit having a positive refractive power; and
  a rear lens group including at least one lens unit,
wherein during zooming, the first lens unit does not move, and the second lens unit, the third lens unit, and at least one lens unit included in the rear lens group move so that intervals between adjacent lens units are changed during zooming, and
wherein the following conditional expressions are satisfied:

$$20.0 < \beta 2t/\beta 2w < 150.0;$$

$$0.01 < M3t/TD \leq 0.075; \text{ and}$$

$$0.47 \leq \beta 3t/\beta 3w < 2.00,$$

where β2w represents a lateral magnification of the second lens unit at a wide angle end, β2t represents a lateral magnification of the second lens unit at a telephoto end, M3t represents a movement amount of the third lens unit during zooming from the wide angle end to the telephoto end, and TD represents a total length of the zoom lens, β3w represents a lateral magnification of the third lens unit at the wide angle end, and β3t represents a lateral magnification of the third lens unit at the telephoto end; and
a solid-state image pickup element configured to receive light of an image formed by the zoom lens.

* * * * *